United States Patent
Sumi et al.

(10) Patent No.: US 10,228,890 B2
(45) Date of Patent: Mar. 12, 2019

(54) APPARATUS, METHOD, AND NON-TRANSITORY COMPUTER-READABLE STORAGE MEDIUM

(71) Applicant: CANON KABUSHIKI KAISHA, Tokyo (JP)

(72) Inventors: Naoki Sumi, Kawasaki (JP); Tomohiro Suzuki, Tokyo (JP); Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 14/724,402

(22) Filed: May 28, 2015

(65) Prior Publication Data

US 2015/0363142 A1    Dec. 17, 2015

(30) Foreign Application Priority Data

Jun. 13, 2014 (JP) .................................. 2014-122748

(51) Int. Cl.
- *G06F 3/12* (2006.01)
- *G06F 9/46* (2006.01)
- *G06T 1/60* (2006.01)
- *G06F 9/455* (2018.01)

(52) U.S. Cl.
CPC .......... *G06F 3/1292* (2013.01); *G06F 3/1214* (2013.01); *G06F 3/1224* (2013.01); *G06F 3/1247* (2013.01); *G06F 9/46* (2013.01); *G06T 1/60* (2013.01); *G06F 9/45529* (2013.01)

(58) Field of Classification Search
CPC .................................................. G06F 3/1205
See application file for complete search history.

(56) References Cited

U.S. PATENT DOCUMENTS

| 5,742,406 | A | 4/1998 | Suzuki | 358/468 |
| 5,742,409 | A | 4/1998 | Suzuki | 358/468 |
| 5,937,069 | A | 8/1999 | Nagai | 380/49 |
| 6,353,482 | B1 | 3/2002 | Abe | 358/1.15 |
| 7,978,909 | B2 | 7/2011 | Umeda | 382/162 |
| 8,045,795 | B2 | 10/2011 | Umeda | 382/275 |
| 8,374,439 | B2 | 2/2013 | Hori | 382/218 |
| 8,705,089 | B2 * | 4/2014 | Araki | G06F 3/1204 358/1.15 |
| 8,873,090 | B2 | 10/2014 | Nakagawa | 358/1.15 |

(Continued)

FOREIGN PATENT DOCUMENTS

| JP | 2004-127252 | 4/2004 | ............. B41J 29/38 |
| JP | 2006-350557 | 12/2006 | |

(Continued)

OTHER PUBLICATIONS

JP Office Action—Application No. 2014-122748 dated Jan. 7, 2016.

*Primary Examiner* — King Poon
*Assistant Examiner* — Michael Burleson
(74) *Attorney, Agent, or Firm* — Venable LLP

(57) ABSTRACT

This invention provides an apparatus use environment with higher flexibility and convenience. To achieve this, in a program including the first program layer with an instruction set to be interpreted and executed by a processor and the second program layer with an instruction set compiled in advance by a unit other than the processor, this invention controls to perform communication between an external device and the first program layer via the second program layer.

26 Claims, 15 Drawing Sheets

(56) References Cited

U.S. PATENT DOCUMENTS

| | | | |
|---|---|---|---|
| 9,055,263 B2 | 6/2015 | Umeda | H04N 1/60 |
| 9,471,284 B2 * | 10/2016 | Kurokawa | G06F 8/31 |
| 2005/0141019 A1 * | 6/2005 | Ohmori | G06F 17/30873 |
| | | | 358/1.15 |
| 2007/0263248 A1 * | 11/2007 | Oshima | G06F 3/1204 |
| | | | 358/1.15 |
| 2008/0068635 A1 * | 3/2008 | Asano | G06F 3/1204 |
| | | | 358/1.13 |

FOREIGN PATENT DOCUMENTS

| | | | |
|---|---|---|---|
| JP | 2010-010938 | 1/2010 | |
| JP | 2010-278708 | 12/2010 | |
| JP | 2011-233034 | 11/2011 | |
| WO | 2012-011228 | 1/2012 | G06T 13/80 |

* cited by examiner

APPARATUS, METHOD, AND NON-TRANSITORY COMPUTER-READABLE STORAGE MEDIUM

BACKGROUND OF THE INVENTION

Field of the Invention

The present invention relates to communication between apparatuses.

Description of the Related Art

In recent years, portable multi-function terminals (to be referred to as mobile computers hereinafter) incorporating a camera function have become widespread, and far surpass digital cameras and conventional personal computers (to be referred to as PCs hereinafter) in sales.

Such mobile computer is basically formed from three elements, that is, hardware as the computer itself, an operating system (to be referred to as an OS hereinafter) operating on the hardware, and an application operating on the OS. By using the application, the user can use a function such as a map, mail, or browsing of a Web site on the Internet.

As examples of the form of such application operating on the mobile computer, there are mainly two application forms, that is, a native application and Web application. The features of each application form will be explained below.

The native application is developed by using a development environment and development language which are prepared for each OS. For example, the C/C++ language is used on an OS provided by company A, the Java® language is used on an OS provided by company B, and a different development language is used on an OS provided by company C. In general, the native application is compiled in advance in each development environment, and transformed from a so-called high-level language understandable by a human into instruction sets such as an assembler directly executable by the CPU of the computer. Thus, the general native application has an advantage that it is possible to perform an operation at high speed since the CPU directly executes instructions.

On the other hand, the Web application indicates an application operating on a Web browser which is normally incorporated in an OS on each computer in recent years. The application is generally developed by using a language such as HTML5, CSS, or JavaScript® so that the Web browser can interpret the application. These languages are Web standard languages. Therefore, if a Web application is described using the Web standard language, it can operate in any environment where the Web browser operates.

For example, Japanese Patent Laid-Open No. 2011-233034 discloses a technique of executing printing by a Web application operating on a Web Browser.

As described above, a recent mobile computer holds a camera of a high resolution. Since the mobile computer is carried every day, and includes a memory capable of storing about several thousand photos, the user can easily enjoy shooting a photo at a very high frequency. An application of performing filter processing of changing the shot image into a monochrome/sepia-toned image or image processing of correcting the brightness, color balance, and the like of the photo has become very important and essential to the user. When creating an application capable of readily providing such image processing to the user without any stress in each of the above two application forms, this may have the following advantages and disadvantages.

The native application has an advantage that it is possible to execute processing at high speed, as described above. However, it is necessary to develop the application using each development language different for each OS. This may increase the development cost and development time, thereby making it impossible to quickly provide the application to the user. Also, it is necessary to compile the native application in advance. Therefore, for example, it may be difficult to change the UI (User Interface) design of the application at the time of an operation, or dynamically add a function, resulting in a lack of flexibility.

As for the Web application, the main body of the Web application described in HTML5, CSS, or JavaScript generally exists on a server outside the mobile computer. Since the Web application is dynamically downloaded from the server to the mobile computer via an Internet line when using it, it is possible to dynamically change the UI design or the like without compiling the application in advance.

However, when executing advanced complex processing, there are only two choices about whether to execute the Web application on the browser by JavaScript or on the server under the security restrictions of the browser. Conventionally, JavaScript is described as a script of character strings perceivable by a human, and can be executed by compiling the script, as needed, at the time of operating the script. Consequently, if complex processing is described by JavaScript, the operation may be slowed down.

On the other hand, if the complex processing is executed by the server, the time is required to upload data such as photos existing in the mobile computer to the server via the Internet line, and download the result of the processing by the server from the server. In some cases, this arrangement cannot implement immediate processing with little stress on the mobile application. In addition, processing by the server cannot be executed offline.

That is, at the zenith of the mobile computer which will come in the near future, it is desired to shorten the development period, and provide a versatile application form and development environment to the user. It is also desired to improve the convenience. For example, it is desired to perform communication with an external device while meeting the security restrictions on a Web application described in a script such as JavaScript.

SUMMARY OF THE INVENTION

The present invention has been made to solve the above problems, and provides an apparatus use environment with higher flexibility and convenience.

According to one aspect of the present invention, there is provided an apparatus comprising: a storage unit configured to store a program including a first program layer with an instruction set to be interpreted and executed by a processor and a second program layer with an instruction set compiled in advance by a unit other than the processor; and a communication control unit configured to control to perform communication between an external device and the first program layer of the program in the storage unit via the second program layer of the program.

According to the present invention, it is possible to provide an apparatus use environment with higher flexibility and convenience.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described in detail below with reference to the accompanying drawings.

First Embodiment

In this embodiment, an arrangement in which a hybrid application (to be described later) is operated on an information processing apparatus, various kinds of image processing are applied to an image selected by the user, and then the image is printed will be explained.

<Description of Hardware Arrangement>

Figure 1:
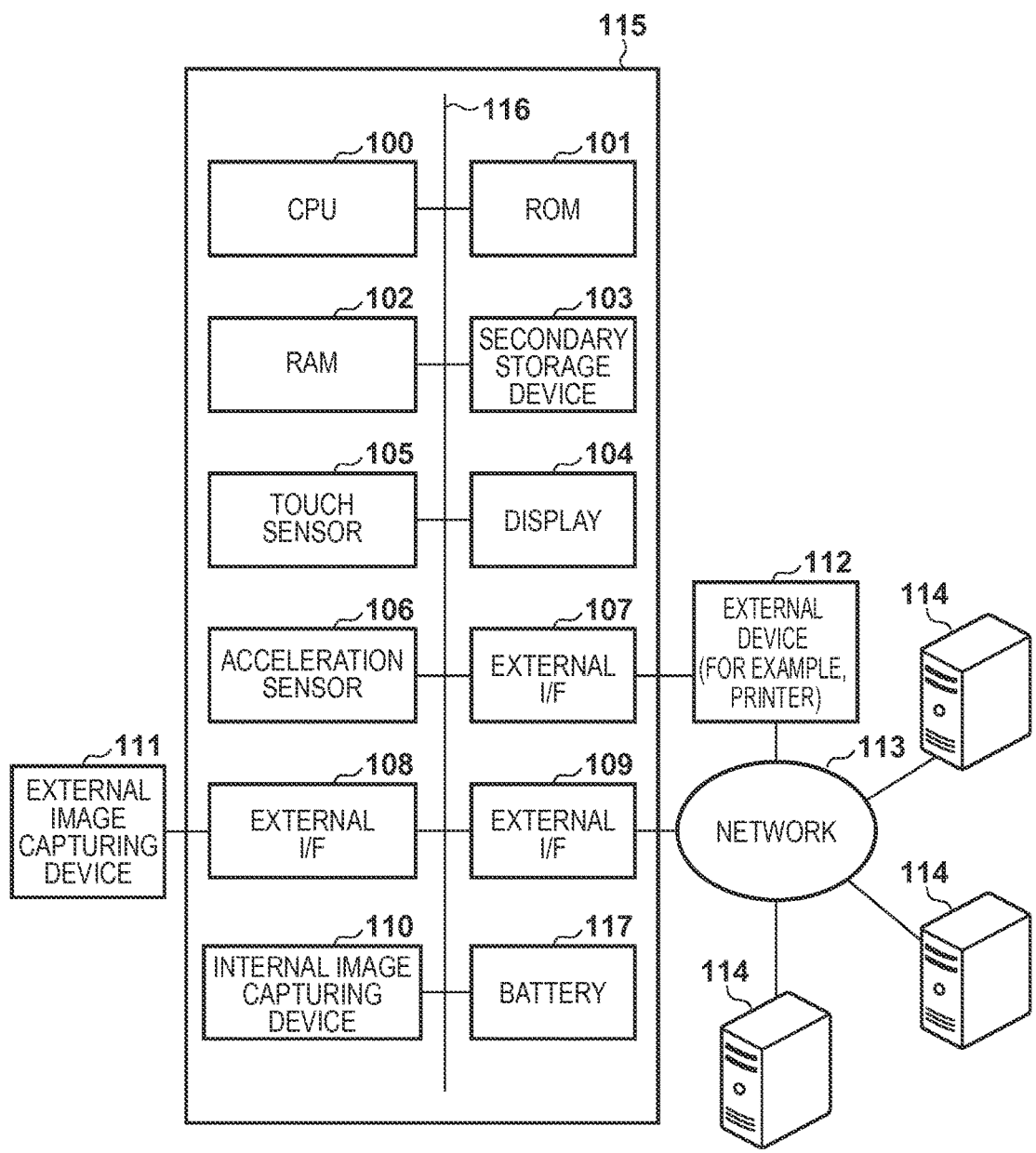
FIG. 1 is a block diagram showing the arrangement of an information processing apparatus.

FIG. 1 is a block diagram showing a portable information terminal such as a smartphone or portable telephone as an information processing apparatus 115. Referring to FIG. 1, a CPU (Central Processing Unit/Processor) 100 executes various kinds of processing (to be described below) according to a program. There is one CPU 100 in FIG. 1 but a plurality of CPUS or CPU cores may be included. A ROM 101 stores a program to be executed by the CPU 100. A RAM 102 is a memory for temporarily storing various kinds of information at the time of execution of the program by the CPU 100.

A secondary storage device 103 such as a hard disk or flash memory is a storage medium for storing various programs and data such as files and databases which hold the processing results of image analysis and the like. A display 104 displays a UI (User Interface) for accepting operations for implementing various kinds of processing, and various kinds of information such as the processing result of executed processing. The display 104 may include a touch sensor 105.

The information processing apparatus 115 may include an internal image capturing device 110. Image data captured by the internal image capturing device 110 undergoes predetermined image processing, and is then saved in the secondary storage device 103. Image data may be loaded from an external image capturing device 111 connected via an external I/F 108.

The information processing apparatus 115 includes an external I/F 109, and can perform communication via a network 113 such as the Internet. The information processing apparatus 115 can acquire, via the external I/F 109, image data from servers 114 connected to the network 113.

The information processing apparatus 115 includes an acceleration sensor 106, and can acquire acceleration information about the position and orientation of the information processing apparatus 115. The information processing apparatus 115 is connected to an external device 112 such as a printer via an external I/F 107, and can output data such as image data. The external device 112 is also connected to the network 113, and can transmit/receive image data via the external I/F 109.

Each of the external I/Fs 107 to 109 is an interface having at least one of a wired communication mode and wireless communication mode, and communicates with an external device (the external device 112 or server 114) in accordance with the communication mode used. For wired communication, for example, USB, Ethernet®, or the like is used. For wireless communication, a wireless LAN, NFC, Bluetooth, infrared communication, or the like is used. If a wireless LAN is used for wireless communication, there are a mode in which apparatuses are directly connected to each other and a mode in which apparatuses are connected to each other via a relay apparatus such as a wireless LAN router. Although the external I/Fs 107 to 109 are arranged separately, they may be integrally arranged.

A battery 117 supplies power necessary for the operation of the information processing apparatus 115. The various components of the information processing apparatus 115 are interconnected via a control bus/data bus 116, and the CPU 100 controls the various components via the control bus/data bus 116.

Note that in this embodiment, the information processing apparatus 115 serves as the execution location (software execution environment) of software such as a program executed by the controlling portion (CPU 100) of the information processing apparatus 115.

<Block Diagram of Software>

Figure 2:
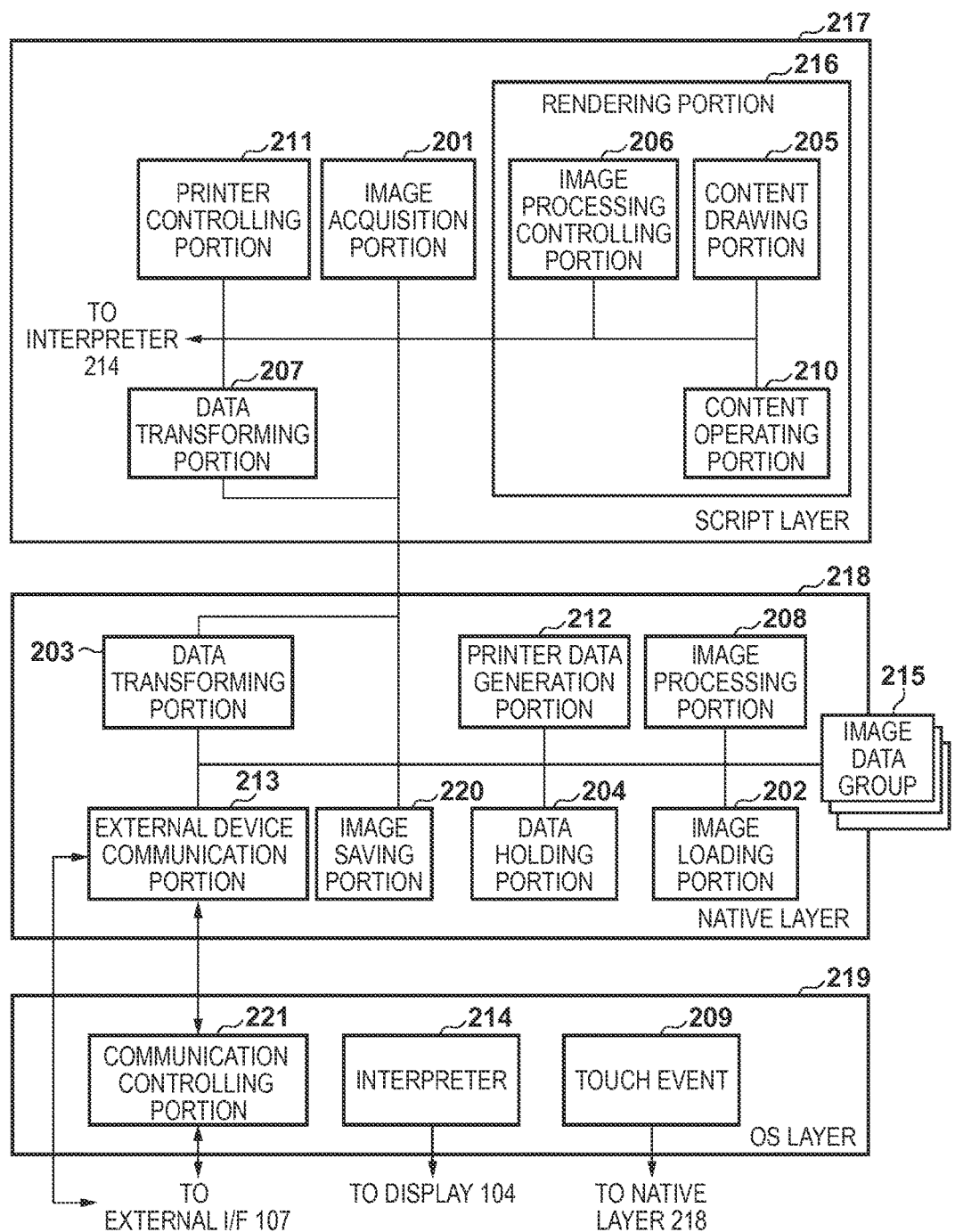
FIG. 2 is a block diagram showing the software arrangement of the information processing apparatus.

FIG. 2 is a block diagram showing the arrangement of software programs operating on the information processing apparatus 115.

The information processing apparatus 115 implements a program of a script layer 217, native layer 218, and OS layer 219. Each layer is implemented when the CPU 100 reads out and executes the corresponding program stored in the ROM 101 or secondary storage device 103.

The script layer 217 is a program layer in which an instruction set (drawing of a content, display of an image, playback of a moving image, and the like) is described by text data using a Web standard language such as HTML5, CSS3, or JavaScript. In this script layer 217, in an application execution environment, various instruction sets of text data are interpreted and executed using a processor (for example, the CPU 100) existing in the application execution environment. For example, there may be a form in which statements are dynamically interpreted line by line every execution operation, a form in which statements are interpreted when activating an application, and a form in which statements are interpreted when installing an application in the information processing apparatus 115.

Processing in the script layer 217 and its contents will be referred to as a script hereinafter. As an example of a form in which the instructions of the script are interpreted in the information processing apparatus 115, the interpreter function included in the native layer 218 or OS layer 219 is used. Note that in this embodiment, a large portion of the UI of the application is assumed to be described in the script layer 217.

The native layer 218 is a portion of executing an instruction set compiled in advance in an environment other than the application execution environment. In the native layer 218, a code described in a high-level language such as C or C++ is compiled in advance on the server or the PC of the developer of the application into an aggregate of instructions interpretable by the CPU 100. Processing in the native layer 218 and its contents, and calling of the function of the OS layer 219 (to be described later) from the native layer 218 will be referred to as "native" hereinafter. Note that an example of another implementation system of the native layer 218 is Java. Java is a high-level language similar to C/C++, and is compiled in advance into an intermediate code in the development environment at the time of development of the application. The compiled intermediate code operates in the Java virtual environment of each OS. In this embodiment, such program form is also regarded as a kind of native layer 218.

The OS layer 219 corresponds to the operating system (OS) of the information processing apparatus 115. The OS layer 219 has a unique function and a role of providing the use of the hardware function to the application. The OS layer 219 includes an API. The function of the OS layer 219 can be used from the script layer 217 and native layer 218.

In this embodiment, allowing calling of the native layer 218 from the script layer 217 will be referred to as "binding" or "bind". The native layer includes an API, and the various functions of the native layer can be used when the API calls the script.

Note that in this embodiment, the application including the script layer 217 and native layer 218 will be referred to as a hybrid application.

An image acquisition portion 201 of the script layer 217 requests the native layer 218 to acquire image data. At the time of the acquisition request, the image acquisition portion 201 generates a unique ID, and transmits it to the native layer 218. This ID and the image data loaded by an image loading portion 202 of the native layer 218 are stored in a pair in a data holding portion 204 of the native layer 218.

The image loading portion 202 of the native layer 218 acquires the image data from an image data group 215. A method of acquiring the image data from the image data group 215 depends on the request of the image acquisition portion 201 of the script layer 217. The request method may be selected from a dialog box provided on the UI, or an image may be directly selected based on the path of a file.

A data transforming portion 203 of the native layer 218 transforms data in the native layer 218 into data in a format usable in the script layer 217. On the other hand, the data transforming portion 203 also transforms data sent from the script layer 217 into a format usable in the native layer 218.

A data transforming portion 207 of the script layer 217 transforms data in the script layer 217 into data in a format usable in the native layer 218. On the other hand, the data transforming portion 207 also transforms data sent from the native layer 218 into a format usable in the script layer 217.

The data holding portion 204 of the native layer 218 holds the image data loaded by the image loading portion 202 and image data having undergone image processing by an image processing portion 208. The held image data is rasterized into, for example, an RGB image signal, and has a format in which it is possible to immediately execute image processing. The held image data is paired with the ID generated by the image acquisition portion 201 of the script layer 217. Thus, it is possible to acquire the corresponding image data from the data holding portion 204 by designating the ID.

A content drawing portion 205 of the script layer 217 displays, on the display 104, the image data acquired via the data transforming portion 203 of the native layer 218. The content drawing portion 205 re-draws image data operated by a content operating portion 210. The content operating portion 210 operates the image data in the script layer 217. Examples of this operation are enlargement, movement, and rotation of the image data.

An image processing controlling portion 206 decides a correction parameter to be used for image processing, and requests the image processing portion 208 of the native layer 218 to perform image processing. First, the image processing controlling portion 206 sets a correction parameter in the script layer 217. In the data transforming portion 207, the set correction parameter is transformed into a format transmittable to the native layer 218. The transformed correction parameter is then transmitted to the native layer 218 together with the ID of image data to be processed.

The image processing portion 208 of the script layer 217 acquires an image corresponding to the ID designated by the image processing controlling portion 206 from the data holding portion 204 of the native layer 218, and performs image processing. At this time, image processing to be performed is decided based on the correction parameter set by the image processing controlling portion 206.

A touch event 209 of the OS layer 219 acquires information about a touch of the display 104. The information about a touch includes, for example, touch detection of the display 104 and touched position information.

A printer controlling portion 211 of the script layer 217 controls a rendering start request to a rendering portion 216, a printer detection request, display of a printer setting screen, and generation and transmission of print information. In the printer setting screen, printer settings such as a paper size, paper type, and color/monochrome are made. A printer data generation portion 212 generates printer data based on the items set in the printer setting screen.

Based on the request from the printer controlling portion 211, the printer data generation portion 212 generates a command and data necessary for printer communication. The data necessary for printer communication is data complying with a communication protocol, and the command is data for deciding the operation of the printer such as printing or scanning.

An external device communication portion 213 of the native layer 218 communicates with the external device 112 (a printer or the like). The external device communication portion 213 transmits the printer data received from the printer data generation portion 212 to the external device 112, and receives information from the external device 112.

Note that the external device communication portion 213 communicates with the external device 112 via the communication controlling portion 221 of the OS layer 219 in this embodiment. However, the external device communication portion 213 may transmit data to the external I/F 107 directly. If a communication controlling portion 221 of the OS layer supports a communication protocol used by the external device 112 to be communicated, the function is used. If the communication controlling portion 221 does not support the communication protocol used by the external device 112 to be communicated, the external device communication portion 213 serves to process communication data according to the communication protocol.

An interpreter 214 of the OS layer 219 interprets/executes an instruction generated in the script layer 217. For example, an instruction of drawing an image or the like is executed via the interpreter 214 and displayed on the display 104.

The image data group 215 is an area which holds image data. An image saving portion 220 saves image data held in the data holding portion 204 in the image data group 215, as needed.

The rendering portion 216 controls the content drawing portion 205, image processing controlling portion 206, and content operating portion 210 to render the image data to be processed. At this time, neither the rendering result nor the image currently generated is displayed on the display 104. The rendering result is transmitted to the data transforming portion 203 of the native layer 218, and transformed into image data in a format usable by the external device 112 (a printer or the like).

<Processing Associated with User Operation>

Figure 3:
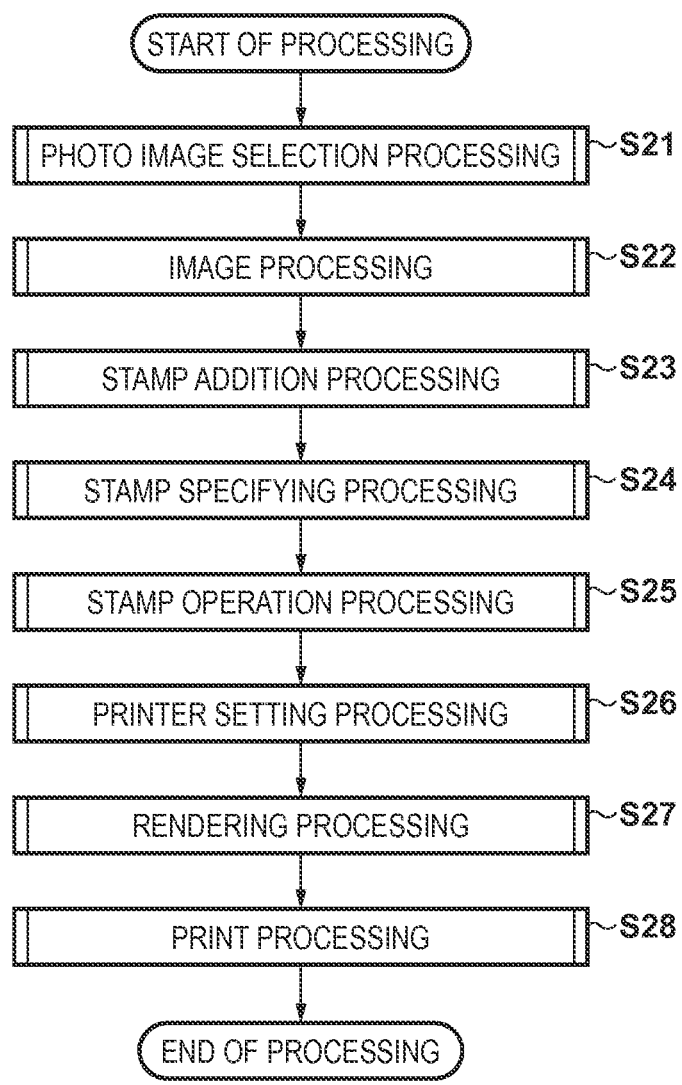
FIG. 3 is a flowchart illustrating processing associated with a user operation.

FIG. 3 is a flowchart illustrating processing including a user operation. An overview of each of processes in steps S21 to S28 will be explained with reference to FIG. 3 and details thereof will be described later. The processing shown in FIG. 3 is implemented when the CPU 100 of the information processing apparatus 115 executes a program stored in the ROM 101 or secondary storage device 103. Each step shown in FIG. 3 transits according to a user operation on an application screen 1200 as a UI shown in FIG. 12. This application screen 1200 is generated by the script layer 217. An operation on the application screen 1200 is implemented via, for example, the touch sensor 105.

In step S21, upon detecting a user operation (including a touch operation, the same shall apply hereinafter) on a photo image selection button 1201 of the application screen 1200, the CPU 100 selects an arbitrary image in accordance with the operation. After the image is selected, the CPU 100 displays the selected image on an entire drawing area 1206 of the application screen 1200.

In step S22, upon detecting a user operation on a slide bar 1202 for adjusting the luminance of the displayed image, the CPU 100 sets a correction parameter to be used for image processing in accordance with the user operation. The CPU 100 performs the image processing for the displayed image according to the set correction parameter, and displays processing contents and a processing result in the drawing area 1206.

In step S23, upon detecting a user operation on a stamp addition button 1203, the CPU 100 displays a stamp list 1207. Upon detecting selection of a stamp by a user operation on the stamp list 1207, the CPU 100 adds/displays the selected stamp in the drawing area 1206.

In step S24, the CPU 100 specifies a stamp in accordance with a user operation on the application screen 1200. The stamp specifying operation is performed to determine whether the stamp has been touched, based on coordinates touched by the user operation on the display 104 and the coordinates of the stamp. If the stamp has been touched, the stamp is set in an operation acceptance status. In this example, the stamp is set in the operation acceptance status in response to the user operation. The operation acceptance status will be described later.

In step S25, upon detecting a user operation on a slide bar 1204 for rotating the stamp in the operation acceptance status, the CPU 100 rotates the stamp in the operation acceptance status as a stamp operation in accordance with the user operation.

In step S26, upon detecting a user operation on a print button 1205, the CPU 100 displays a setting screen 1301 (FIG. 13) for setting information necessary for printing. The information necessary for printing includes, for example, a paper size, paper type, print quality, bordered/borderless setting item, as shown in the setting screen 1301 of FIG. 13. In addition, settable setting items such as double-sided/single-sided and monochrome/color are provided depending on the functions of the printer to be used.

In step S27, upon detecting a user operation on a setting completion button 1302 of the setting screen 1301, the CPU 100 executes rendering to transform the image displayed in the drawing area into a print resolution for output to the printer.

In step S28, the CPU 100 transmits the image transformed into the print resolution to the external device 112 together with a printer control command to print the image by the external device 112.

Note that minimum steps are indicated in the processing shown in FIG. 3 for the sake of simplicity. However, processing contents are not limited to them, and the processing order of the steps is not limited to this. In this embodiment, the first program layer including an instruction set to be interpreted and executed by the processor is defined as the script layer 217, and the second program layer including an instruction set compiled in advance by a portion other than the processor is defined as the native layer 218. A program including the first program layer and the second program layer implements a hybrid application. Character string data is defined as the first format and binary data is defined as the second format.

<Details of Photo Image Selection Processing>

Figure 4:
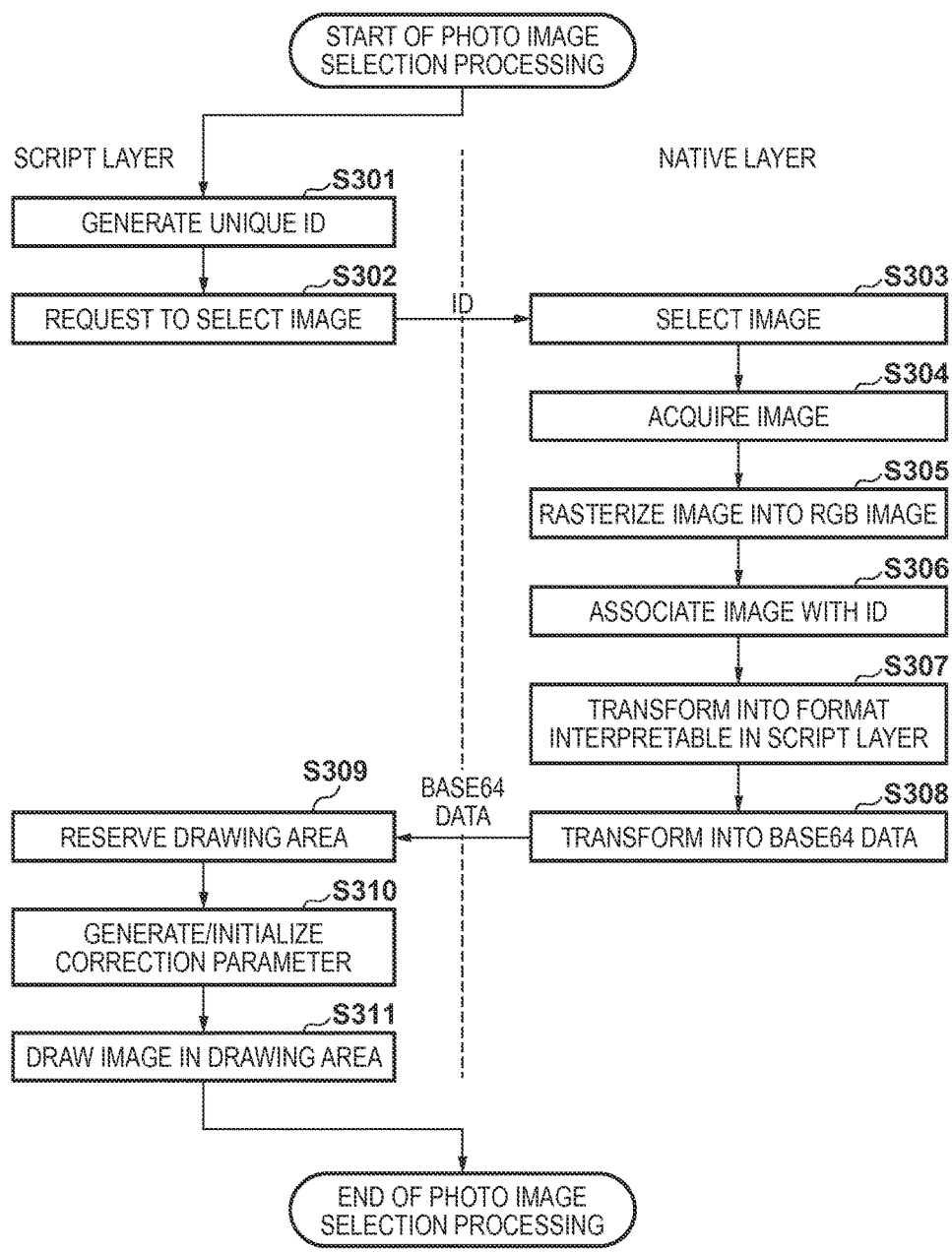
FIG. 4 is a flowchart illustrating details of photo image selection processing.

Details of the photo image selection processing in step S21 of FIG. 3 will be described with reference to FIG. 4.

In step S301, the CPU 100 generates a unique ID in the script layer 217. This ID may have any form such as a numerical value or character string as long as it can be transmitted from the script layer 217 to the native layer 218.

In step S302, in the script layer 217, the CPU 100 requests the native layer 218 to select an image in accordance with a user operation on the photo image selection button 1201 together with the generated ID. As a request method, the binding function is used to call an image selection API unique to the native layer 218 from the script layer 217. A function capable of being directly called from the script layer 217 or a so-called wrapper of indirectly calling the function is prepared in advance in the native layer 218.

In step S303, in the native layer 218, the CPU 100 displays a device-specific image selection UI on the display 104. Based on a user operation on the displayed image selection UI, one arbitrary image is selected. In the image selection processing, for example, one image is selected from a folder managed in the information processing apparatus 115. The present invention, however, is not limited to this. For example, an image on the Internet or an image in a detachable storage medium may be selected, or an image shot using the internal image capturing device 110 of the information processing apparatus 115 may be acquired.

In step S304, in the native layer 218, the CPU 100 acquires the selected image. If, for example, the selected image is in the form of an image file, the CPU 100 opens the file, and reads out its contents. In step S305, in the native layer 218, the CPU 100 rasterizes the acquired image into an RGB image. In step S306, in the native layer 218, the CPU 100 holds the rasterized RGB image in the data holding portion 204 in association with the ID acquired from the script layer 217. As an association method, for example, an object having the ID and RGB image is created to make it possible to specify the RGB image by the ID. An association method is not limited to this, and a path as the access destination of the ID and the selected image, a function or class to be executed in accordance with the ID and RGB rasterization, and the like can be used.

In step S307, in the native layer 218, the CPU 100 transforms the rasterized RGB image into data in a format interpretable in the script layer 217. In this embodiment, the transformed data format is JPEG (Joint Photography Expert Group). In step S308, in the native layer 218, the CPU 100 transforms the data in the JPEG format into base64 data, and transmits the base64 data to the script layer 217. This is done because the data array of the RGB image cannot be used intact in the script layer 217, and it is thus necessary to transform, in the native layer 218, the data array into a format usable in the script layer 217. Since only a character string can be used in JavaScript®, the base64 format which represents data as a character string is used in this embodiment.

In step S309, in the script layer 217, the CPU 100 receives the base64 data transformed in the native layer 218, and reserves a drawing area for displaying the base64 data in the RAM 102. In this embodiment, as an example of reserving the drawing area, the HTML canvas function is used, and the API of the Context object of a canvas is used to draw an image.

In step S310, in the script layer 217, the CPU 100 generates and initializes a correction parameter. The correction parameter is an object holding parameters for deciding contents of the image processing in step S22. An example of the correction parameter held by JavaScript® is:

```
var CorrectionParam = function( ){
    this.brightness = 0;
}
```

This correction parameter represents that a variable "brightness" is provided for brightness correction in a CorrectionParam object and a value of 0 is stored.

In this embodiment, for the sake of simplicity, the correction parameter only for brightness (luminance) correction is used. However, parameters (the intensity of a blur filter, ON/OFF of a sepia transform, and the like) for other correction processes may be added.

In step S311, in the script layer 217, the CPU 100 designates base64 data as data to be drawn in the drawing area, thereby drawing an image in the drawing area according to the designation. More specifically, the interpreter 214 interprets the script of the base64 data, and displays it as an image in the drawing area. An example of a sample code of reflecting the base64 data on the drawing area is:

```
var base64Data = base64 data from native layer
var canvas = document.createElement("canvas");
//reserve the drawing area of an image
canvas.setAttribute("width", 100);    //set the
size of the drawing area
canvas.setAttribute("height", 100);
var context = canvas.getContext("2d");  //generate an
```

-continued

```
object having an API to be drawn in the drawing area
var img = new Image( );  //generate an Image object
img.src = base64Data;    //set the received base64
data as the URI of the image
img.onload = function( ){  //start processing after the
end of loading of the image
context.drawImage(img, 0, 0);  //draw the image in the
drawing area using a method of a context object
document.getElementById("div").appendChild(canvas);
//This flowchart assumes a layer structure of many
canvases. These canvases do not freely exist
everywhere, and drawing, moving, and enlargement
operations are performed within a specific area (the
drawing area 1206 of FIG. 12). The area is designated
by "div", and each canvas is added to "div".
}
```

<Details of Image Processing>

Figure 5:
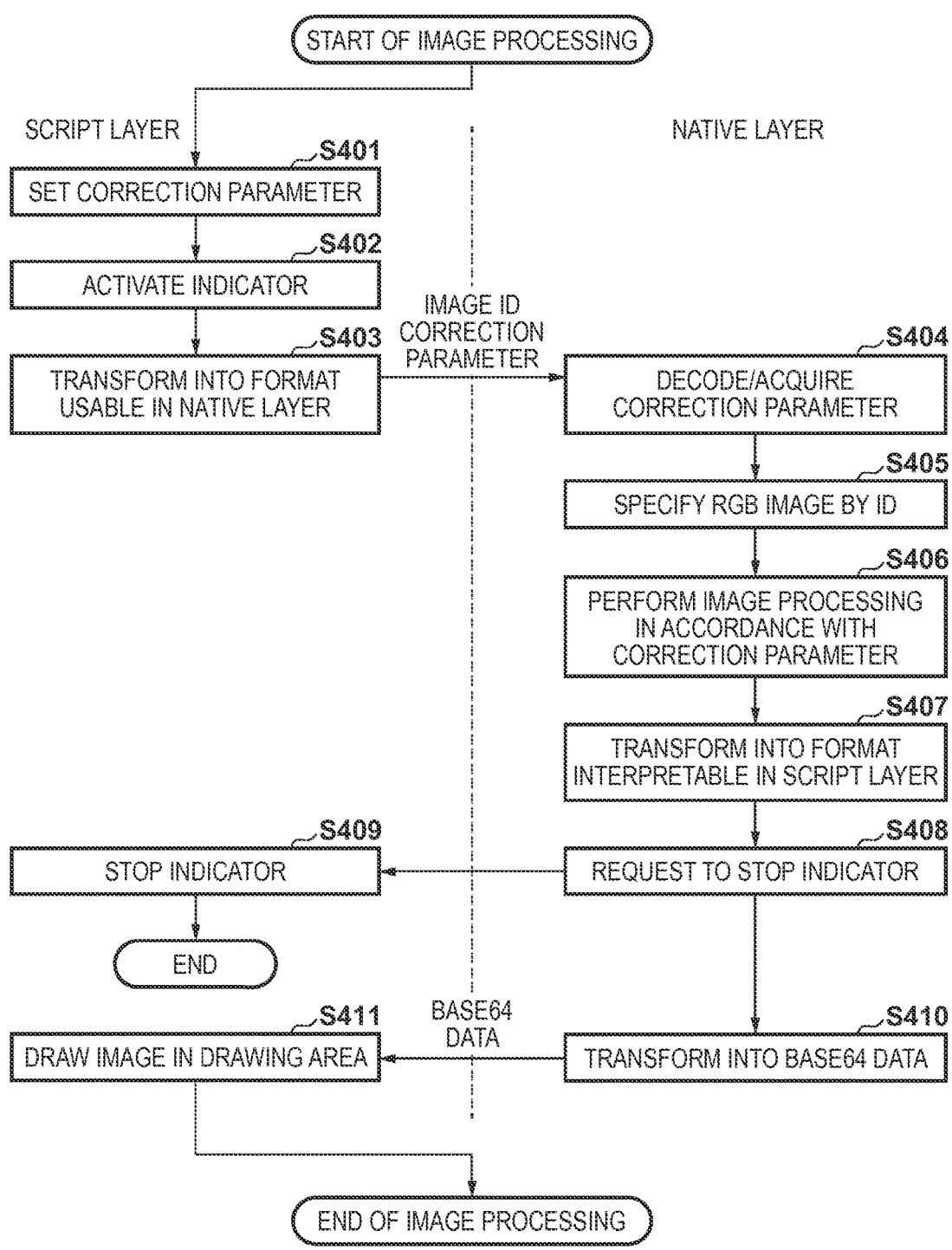
FIG. 5 is a flowchart illustrating details of image processing.

Details of the image processing in step S22 of FIG. 3 will be described with reference to FIG. 5.

In step S401, in the script layer 217, the CPU 100 sets the correction parameter. In this example, the CPU 100 updates the value of "brightness" of the correction parameter generated in step S310 of FIG. 3 by a value set in accordance with a user operation on the slide bar 1202. In step S402, in the script layer 217, the CPU 100 activates an indicator, and displays it on the display 104. The indicator is displayed to notify the user that the processing is in progress, and is generally represented by a progress bar, a clock mark, or an image such as flickering or rotation of a figure. In step S403, in the script layer 217, the CPU 100 transforms the set correction parameter into a format usable in the native layer 218. In this example, the correction parameter is in the form of an object, and cannot be used intact in the native layer 218. Thus, the CPU 100 transforms the set correction parameter into a JSON character string. The CPU 100 transmits the correction parameter transformed into the JSON character string to the native layer 218 together with the ID generated in step S301 of FIG. 3.

In step S404, in the native layer 218, the CPU 100 decodes the correction parameter transformed into the JSON character string, thereby acquiring the correction parameter. In step S405, in the native layer 218, the CPU 100 specifies the RGB image rasterized in step S305 of FIG. 3 based on the ID acquired from the script layer 217. In step S406, in the native layer 218, the CPU 100 determines image processing to be performed based on the acquired correction parameter, and performs the image processing for the RGB image. In step S407, in the native layer 218, the CPU 100 transforms the RGB image having undergone the image processing into data in a format interpretable in the script layer 217. In this example, the CPU 100 transforms the RGB image into data in the JPEG format, similarly to step S307 of FIG. 3. In step S408, in the native layer 218, the CPU 100 requests the script layer 217 to stop the indicator. This is implemented by calling an indicator stop function defined in the script layer 217 from the native layer 218.

In step S409, in the script layer 217, the CPU 100 stops the indicator, and removes the indicator displayed on the display 104.

On the other hand, in step S410, in the native layer 218, the CPU 100 transforms the transformed data in the JPEG format into base64 data, and transmits the base64 data to the script layer 217.

In step S411, in the script layer 217, the CPU 100 receives the base64 data transformed in the native layer 218, and draws an image in the drawing area reserved in step S309 of FIG. 3 in accordance with the base64 data.

<Details of Stamp Addition Processing>

Figure 12:
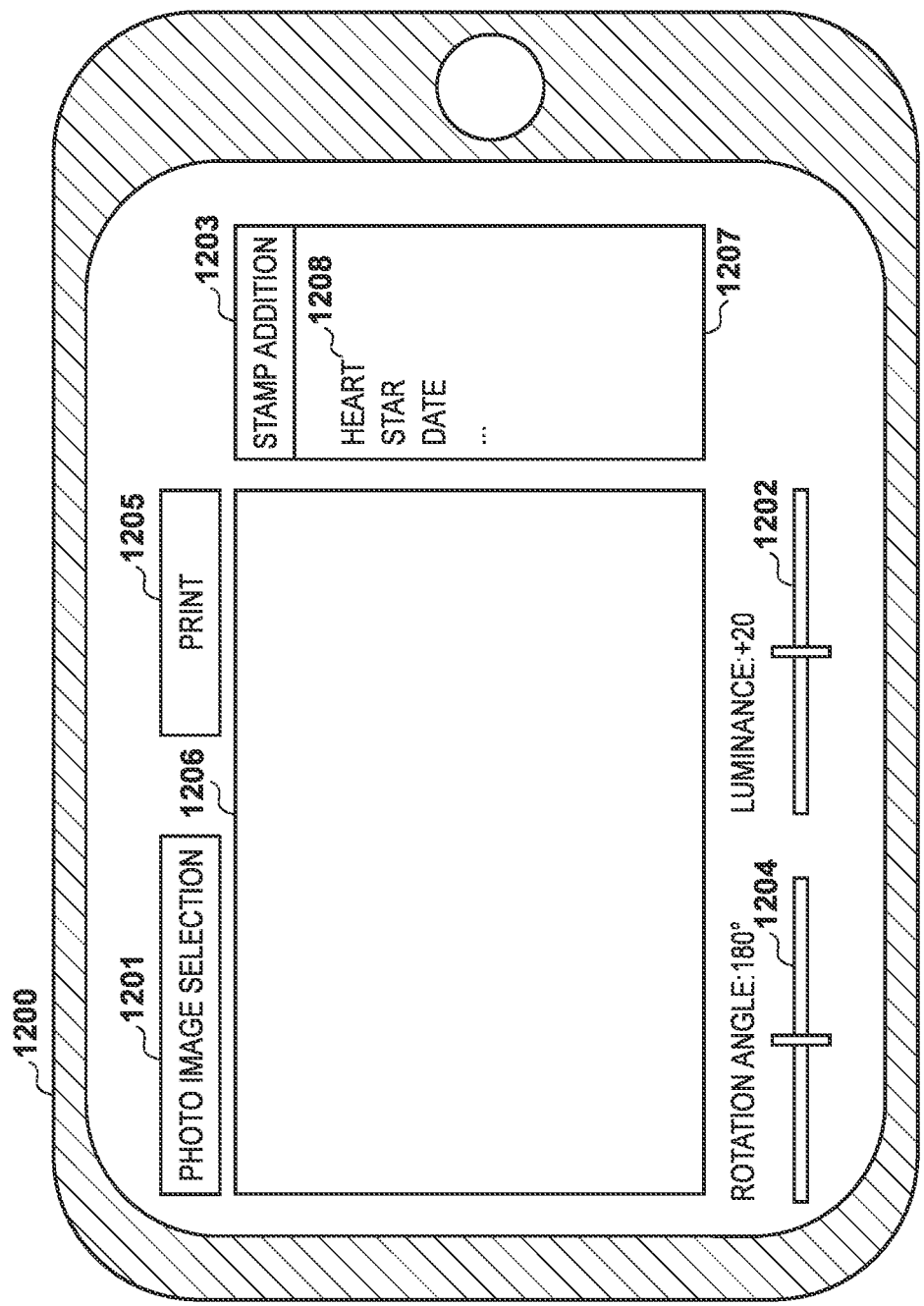
FIG. 12 is a view showing an example of an application screen.

Details of the stamp addition processing in step S23 of FIG. 3 will be described with reference to FIG. 6. In this example, a case in which a heart stamp 1208 is selected after the stamp addition button 1203 of the application screen 1200 shown in FIG. 12 is pressed by a user operation and the stamp list is displayed will be exemplified.

In step S501, in the script layer 217, the CPU 100 generates a unique ID. This ID has the same characteristic as that of the ID generated in step S301 of FIG. 3. In step S502, in the script layer 217, the CPU 100 transmits the access destination (absolute path) of an image to be used as a stamp to the native layer 218 together with the generated ID, thereby requesting to select the stamp image corresponding to the stamp.

In step S503, in the native layer 218, the CPU 100 acquires the stamp image using the absolute path of the stamp image received from the script layer 217 and a device-specific image selection API. In step S504, in the native layer 218, the CPU 100 rasterizes the acquired stamp image into an RGB image. In step S505, in the native layer 218, the CPU 100 holds the rasterized RGB image in the data holding portion 204 in association with the ID acquired from the script layer 217. An association method is the same as that in step S306 of FIG. 3. In step S506, in the native layer 218, the CPU 100 transforms the rasterized RGB image into data in a format interpretable in the script layer 217. In this transform processing, the CPU 100 transforms the RGB image into data in the JPEG format, similarly to step S307 of FIG. 3. In step S507, in the native layer 218, the CPU 100 transforms the data in the JPEG format into base64 data, and transmits the base64 data to the script layer 217.

In step S508, in the script layer 217, the CPU 100 receives the base64 data transformed in the native layer 218, and reserves a drawing area for displaying the base64 data in the RAM 102. In step S509, in the script layer 217, the CPU 100 generates and initializes an object parameter. Note that the object parameter is an object for holding parameters to be used, at the time of the rendering processing in step S27 of FIG. 3, to decide the rotation angle of the stamp after the rendering processing. An example of the object parameter held by JavaScript® is:

```
var ObjectParam = function( ){
    this.theta = 0;
    this.posX = 0;
    this.posY = 0;
    this.width = 100;
    this.height = 100;
}
```

This object parameter represents that a variable "theta" indicating the rotation angle is provided in an ObjectParam object and a value of 0 is stored in "theta". Similarly, "posX" represents an x-coordinate when the upper left corner of the drawing area is set as a reference point, "posY" represents a y-coordinate when the upper left corner of the drawing area is set as a reference point, "width" represents the lateral width of the drawing area, and "height" represents the longitudinal width of the drawing area. Note that the object parameter is minimized in this embodiment for the sake of simplicity. However, it is apparent that other parameters (translation amount, enlargement magnification, and the like) can be added and used at the time of drawing or rendering.

In step S510, in the script layer 217, the CPU 100 displays the base64 data as an image in the drawing area 1206 based on the generated object parameter. Note that one stamp is selected in this embodiment for the sake of simplicity. However, a plurality of stamps can be selected. In addition, an image prepared in advance is used as a stamp in this embodiment. However, a method of generating, in the script layer, an object to be drawn by using a Context object may be used.

<Details of Stamp Specifying Processing>

Figure 7:
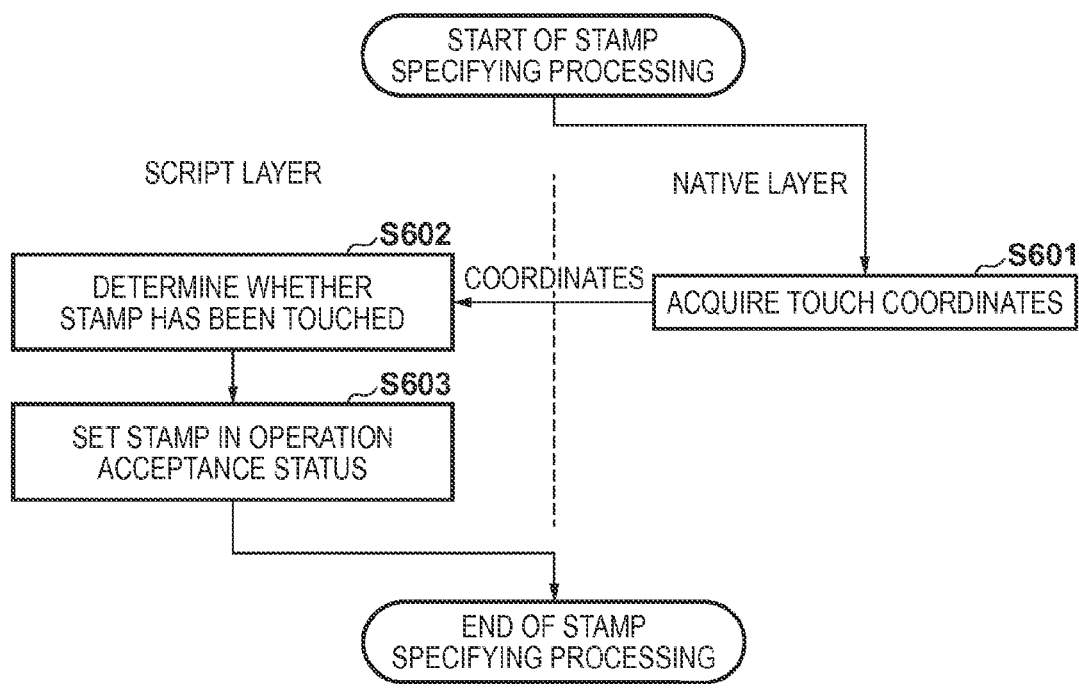
FIG. 7 is a flowchart illustrating details of stamp specifying processing.

Details of the stamp specifying processing in step S24 of FIG. 3 will be described with reference to FIG. 7.

In step S601, in the native layer 218, the CPU 100 acquires coordinates touched on the display 104, and transmits them to the script layer 217.

Figure 6:
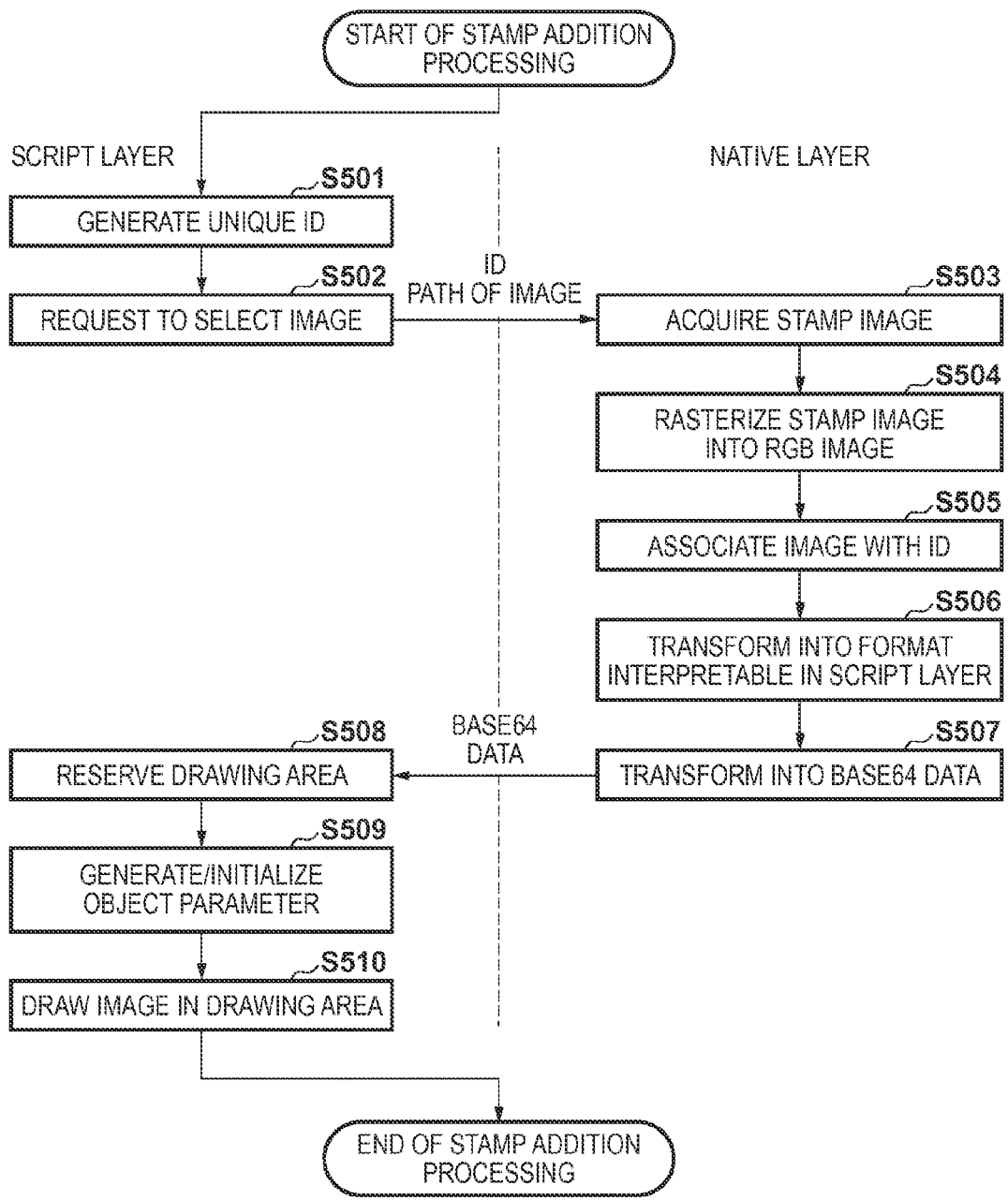
FIG. 6 is a flowchart illustrating details of stamp addition processing.

In step S602, in the script layer 217, the CPU 100 determines whether the stamp added in step S23 of FIG. 3 has been touched, based on the coordinates received from the native layer 218 and information of the object parameter generated in step S509 of FIG. 6. In the added stamp, the object parameter includes the initial values. Therefore, according to the above example of the object parameter, the stamp is drawn in an area of 100 in the x direction and 100 in the y direction with reference to (0, 0) set at the upper left corner of the drawing area 1206. If, therefore, a value obtained by subtracting the x-coordinate of the drawing area 1206 from the x-coordinate of the received coordinates (x, y) falls within the range from 0 to 100, and a value obtained by subtracting the y-coordinate of the drawing area 1206 from the y-coordinate of the received coordinates (x, y) falls within the range from 0 to 100, it can be determined that the stamp has been touched. If it is determined that the stamp has been touched, the stamp is set in the operation acceptance status. The following description will be provided by assuming that the stamp added in step S23 has been touched.

In step S603, in the script layer 217, the CPU 100 sets the stamp in the operation acceptance status in accordance with the determination result. Setting the stamp in the operation acceptance status is equivalent to temporarily recording the ID of the touched stamp as a stamp ID of interest in the script layer 217. Since images and IDs are stored in pairs in the data holding portion 204, if only an ID is grasped, it is possible to specify a unique image.

<Details of Stamp Operation Processing>

Figure 8:
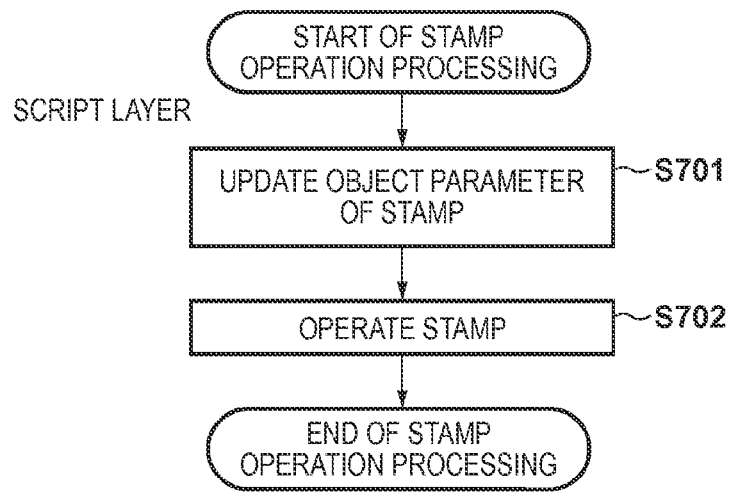
FIG. 8 is a flowchart illustrating details of stamp operation processing.

Details of the stamp operation processing in step S25 of FIG. 3 will be described with reference to FIG. 8.

In step S701, in the script layer 217, the CPU 100 updates the value of "rotate" of the object parameter of the stamp. For example, the CPU 100 updates the value by a value set using the slide bar 1204 of FIG. 12. In step S702, in the script layer 217, the CPU 100 re-draws the stamp set in the operation acceptance status in step S603 of FIG. 7 in the drawing area 1206 by using the object parameter. If, for example, the stamp image is drawn in an HTML canvas, it is possible to rotate the image in the canvas by using the rotate method of the Context object of the canvas.

Note that an operation of the stamp is only rotation in this embodiment. However, other operations such as enlargement/reduction and translation may be possible. It is also apparent that if a photo image has an object parameter, the same operation as the stamp operation is possible.

<Details of Printer Setting Processing>

Details of the printer setting processing in step S26 of FIG. 3 will be described with reference to FIG. 9.

In step S801, in the script layer 217, the CPU 100 requests the native layer 218 to acquire printer information as device information. This is equivalent to a request from the script layer 217 for communicating with the external device 112. As a request method, an API unique to the native layer is called from the script layer by using the binding function, similarly to the image selection processing. A function capable of being directly called from the script layer 217 or a so-called wrapper of indirectly calling the function is prepared in advance in the native layer 218. For example, a native function GetPrinterInfo is prepared, and called from the script side. In this way, the native layer acquires a request to communicate with an external device from the script layer.

In general, it is impossible to directly communicate with an external device from the script layer 217 under the security restrictions. Therefore, as described above, the script layer 217 requests the native layer 218 to acquire external device information, and then communicates with an external device via the native layer 218. The native layer 218 has a function of communicating with an external device (for example, the printer 112) via the OS layer 219.

In step S802, in the native layer 218, the CPU 100 calls a function for acquiring the printer information in accordance with the request from the script layer 217, and performs detection of a printer, that is, so-called discovery. As an example of a detection method, a printer connected via the same wireless LAN router is detected. In this example, since detection of a communicable printer is performed, the CPU 100 requests a response by a broadcast or multicast method by a protocol such as Bonjour, and stands by for a response from a printer, thereby detecting the printer.

In step S803, upon accepting the printer detection request of the information processing apparatus 115, the printer as the external device 112 responds to it. The external device 112 includes, for example, an IP address as information for identifying itself in the response.

In step S804, in the native layer 218, the CPU 100 stores the IP address included in the response from the external device 112. In step S805, in the native layer 218, the CPU 100 transmits a printer information acquisition command as a device information acquisition command to the external device 112 corresponding to the stored IP address. If there are a plurality of external devices 112 which have responded, the CPU 100 transmits the printer information acquisition command to each of all the external devices 112. The printer information acquisition command is an instruction to designate the operation of the printer, and its example is expressed in XML given by:

```
01:   <?xml version="1.0" encoding="utf-8" ?>
02:   <cmd xmlns:trans="http://www.xxxx/yyyyy/">
03:     <contents>
04:       <operation>GetInformation</operation>
05:     </contents>
06:   </cmd>
```

A numerical value such as "01:" written in the left portion of each line is a line number added for the descriptive purpose, and is not described in actual text data in the XML format.

The first line indicates a header representing that the command is described in the XML format.

On the second line, "cmd" indicates the start of the command. A name space is designated by "xmlns" to designate the definition of interpretation of the command. Note that </cmd> on the sixth line indicates the end of the command.

The third line indicates a declaration of describing contents thereafter, and the fifth line indicates the end of the contents.

On the fourth line, an instruction to be requested is described. An actual instruction word exists between <operation> and </operation>. An instruction word "GetInformation" is an instruction of acquiring information of a printer as an external device. For example, it is requested to provide capability information such as a paper type, a size, the presence/absence of a borderless print function, and the print quality supported by the printer.

Note that a printer information acquisition command may be generated by, for example, loading permanent text stored in advance in the ROM 101. Also, the format is not limited to the text format such as XML, and the command may be described in the binary format, and communicated by a protocol complying with the format. The generated printer information acquisition command is transmitted to the external device 112 via the external device communication portion 213 in a format complying with a communication protocol such as HTTP supported by the printer.

A communication method is not limited to this. Connection using Wi-Fi® Direct, Bluetooth®, infrared communication, telephone line, wired LAN, or USB may be used. By performing communication by a protocol complying with the method, it is possible to obtain the same effects.

Figure 9:
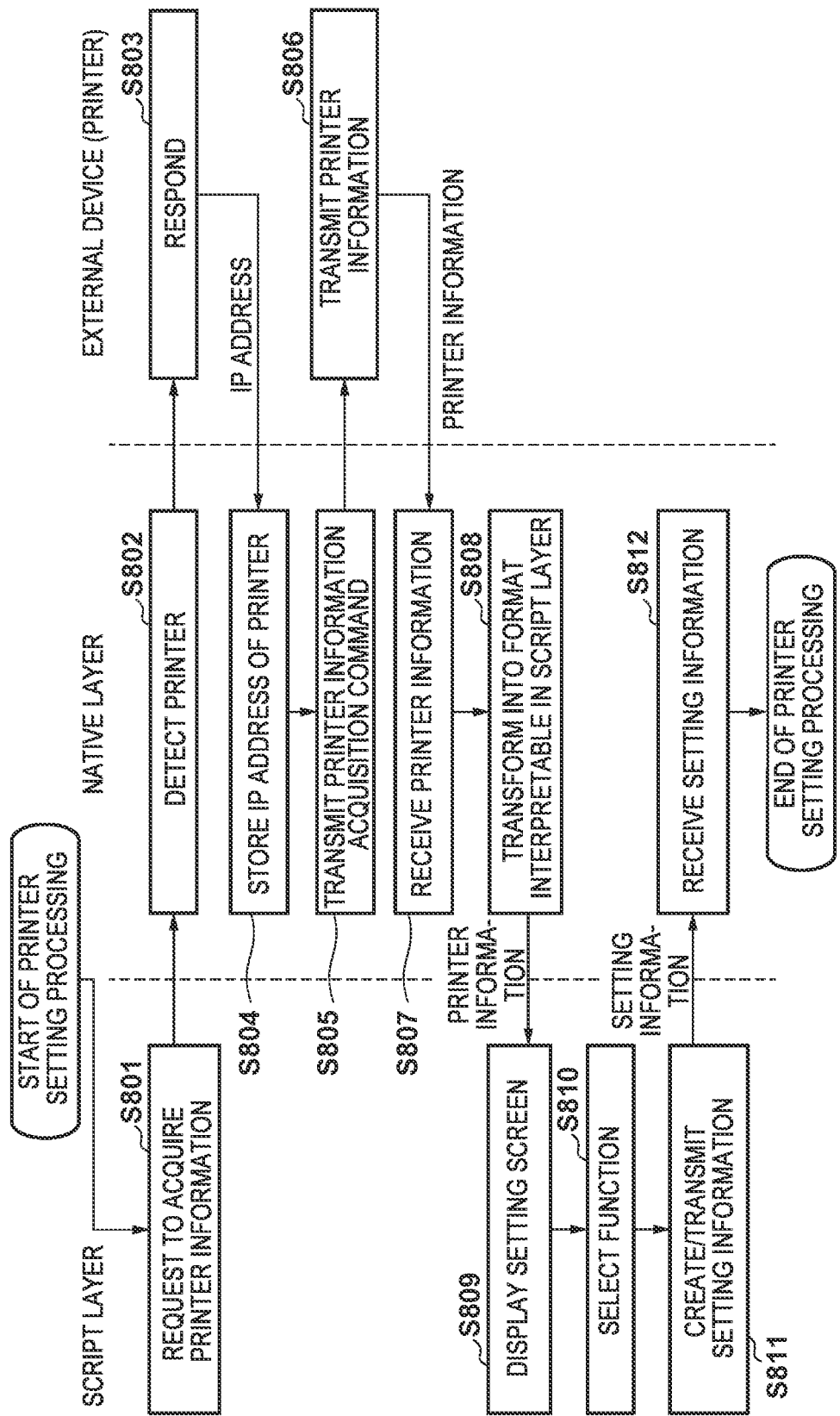
FIG. 9 is a flowchart illustrating details of stamp setting processing.

Referring to FIG. 9, a printer information acquisition command is generated in the native layer 218. However, even if a printer information acquisition command is generated in the script layer 217, it is possible to obtain the same effects. In this case, in the script layer 217, a printer information acquisition command including the above statement in the XML format is created in the script layer 217, and transferred to the native layer 218. Upon receiving the statement, the native layer 218 transmits the printer information acquisition command to the external device 112 in a format complying with a communication protocol.

In step S806, upon receiving the printer information acquisition command from the information processing apparatus 115, the external device 112 transmits the printer information as device information in the XML format to the information processing apparatus 115 according to the communication protocol. An example of the printer information is given by:

```
01:   <?xml version="1.0" encoding="utf-8" ?>
02:   <cmd xmlns:trans="http://www.xxxx/yyyyy/">
03:     <contents>
04:       <device id="Printer001" />
05:       <mode = 1>
06:         <media>GlossyPaper</media>
07:         <size>A4</size>
08:         <quality>1</quality>
```

```
09:         <border>no</border>
10:       </mode>
11:       <mode = 2>
          ...
          </mode>
          <mode = 3>
          ...
          </mode>
          ...
        </contents>
      </cmd>
```

The first line indicates a header representing that the information is described in the XML format.

On the second line, "cmd" indicates the start of the command. A name space is designated by "xmlns" to designate the definition of interpretation of the command. Note that </cmd> on the last line indicates the end of the command.

The third line indicates a declaration of describing contents thereafter, and the contents are continuously described up to </contents>.

The fourth line indicates a device ID. In this example, the model name of the external device 112 as a printer is "Printer001".

On the fifth line and subsequent lines, the respective modes of the external device 112 are described. Information in one mode is described between <mode> and </mode>. On the fifth line, the number of a mode is 1. After that, <media> describes the type of printing paper, <size> describes a paper size, <quality> describes the print quality, and <border> describes bordered/borderless information.

On the 11th line and subsequent lines, information about mode 2 as another mode is described. In this way, the model name of the external device 112 and all the modes supported by the printer are described in the XML data.

Note that a method of describing printer information is not limited to this. The printer information may be described in another format such as a binary format or a text format which is not a tag format. In steps S805 and S806, information of the print function of the printer is exchanged. However, the present invention is not limited to this. For example, information about image processing and analysis processing processable by the printer, the presence/absence of a mode (silent mode) of reducing a sound generated at the time of printing, the presence/absence of the use of a memory card, and a status such as the remaining ink amount may be exchanged. Examples of the image processing are monochromatic or sepia processing, a color transform such as color enhancement, layout of a plurality of images, white balance correction, noise removal, and processing of automatically correcting a photo to preferable color and luminance.

In step S807, in the native layer 218, the CPU 100 receives the printer information from the external device 112. In the native layer, the CPU 100 acquires, from the received printer information, terms of the type and size of printing paper, the print quality, and bordered/borderless and a term count in each of all the modes of the external device 112 and.

In step S808, in the native layer 218, the CPU 100 transforms the received printer information into a format interpretable in the script layer 217, and transmits the transformed information to the script layer 217. That is, the information obtained by communication with the printer as the external device 112 is transferred to the script layer 217.

More specifically, the native function is provided, and the binding function is used. The native function is called from the script layer 217, and the information is transferred as a return value. By setting a mode to be acquired or the like as an argument, the script layer 217 may receive the return value of the mode. As another example, there is a method of transmitting the received printer information in the XML format, or transmitting the printer information by transforming it in a text format without any tag. In addition, the information may be transferred by using the above-described JSON character string, or transferred by a character string such as base64 by using the data transforming portions 207 and 203.

In step S809, in the script layer 217, the CPU 100 forms a setting screen (FIG. 13) including functions usable by the printer based on the printer information received from the native layer 218, and displays the setting screen. This is called display control in this embodiment. If there are a plurality of connectable printers, a display screen for displaying printer names and prompting the user to select a printer for printing is generated (display contents are controlled). Note that a printer selection method is not limited to this, and a method of selecting a printer which responds earliest, a method of selecting a printer having more functions, a method of selecting a printer with not so many print jobs, or the like may be used.

As described above, in the script layer 217, the CPU 100 displays the setting screen 1301 (FIG. 13) for prompting the user to select functions usable by the printer, such as the type and size of printing paper, the print quality, and bordered/borderless. As an example of a method of forming a setting screen, a sample of an HTML description is given by:

```
<!DOCTYPE html>
  <head>
  <title>print setting</title>
  <script>
    <!-- paper size -->
    var PaperSizeNum = GetPaperSizeNum( );
    var p = document.getElementById("PaperList");
    var i;
    for(i=0; i<PaperSizeNum; i++){
      p.options[i] = new Option(GetPaperSizeT(i),
GetPaperSizeV(i));
    }
    <!-- paper type -->
    var MediaTypeNum = GetMediaTypeNum( );
    var m = document.getElementById("MediaList");
    var j;
    for(j=0; j<MediaTypeNum; j++){
      m.options[i] = new Option(GetMediaTypeT(j),
GetMediaTypeV(j));
    }
    <!-- print quality -->
    var QualityNum = GetQualityNum( );
    var q = document.getElementById("QualityList");
    var k;
    for(k=0; k< QualityNum; k++){
      q.options[i] = new Option(GetQualityT(k),
GetQualityV(k));
    }
    <!-- bordered/borderless -->
    var BorderNum = GetBorderNum( );
    var b = document.getElementById("BorderList");
    var l;
    for(l=0; l<BorderNum; l++){
      b.options[i] = new Option(GetBorderT(l),
GetBorderV(l));
    }
    <!-- print function -->
    function printer( ) {
    SetPrint(document.getElementById("PaperList").value,
        document.getElementById("MediaList").value,
```

```
              document.getElementById("QualityList").value,
              document.getElementById("BorderList").value);
        }
      </script>
    </head>
      <!-- display portion -->
      <body>
        paper size <select id="PaperList"></select><br/>
        paper type <select id="MediaList"></select><br/>
        print quality <select
id="QualityList"></select><br/>
          bordered/borderless <select
id="BorderList"></select><br/>
          <br/>
        <button id="btn1" onclick="printer( )">setting
completion</button>
      </body>
    </html>
```

In the above sample, GetPaperSizeNum( ), GetMediaTypeNum( ), GetQualityNum( ), and GetBorderNum( ) are native functions, and each native function has a function of acquiring an item count. For example, paper sizes supported by the printer are A4, A5, B5, and L size, GetPaperSizeNum( ) returns 4.

Also, GetPaperSizeT(n), GetMediaTypeT(n), GetQualityT(n), and GetBorderT(n) are native functions, and each function returns the nth character string. For example, the return value of GetPaperSizeT(0) as a function of returning text of the paper size is "A4", and the return value of GetPaperSizeT(1) is "A5". These values are extracted by the native function from the printer information received from the printer.

Furthermore, GetPaperSizeV(n), GetMediaTypeV(n), GetQualityV(n), and GetBorderV(n) are native functions, and each function returns a value corresponding to the value of the argument n. For example, the return value of GetMediaTypeV(0) as a function of returning text of the paper type is "glossy paper" as a word displayed and presented to the user. On the other hand, the return value of GetMediaTypeV (0) is "GlossyPaper" as a word interpretable by the printer. The word is decided by the negative function by associating it with the printer information. For example, if the value extracted from the printer information is "GlossyPaper", text to be displayed is decided as "glossy paper". As a decision method, the native function holds in advance a correspondence table between these values, and decides text according to the correspondence table.

Note that as an example, the paper size, paper type, print quality, and bordered/borderless settings are made. The present invention, however, is not limited to this. As another example, other setting items such as double-sided/single-sided, color/monochrome, and ON/OFF of image correction are set. Furthermore, not only the print function but also information about image processing and analysis processing processable by the printer, the presence/absence of a silent mode, the presence/absence of the use of a memory card, and a status such as the remaining ink amount may be displayed.

Figure 13:
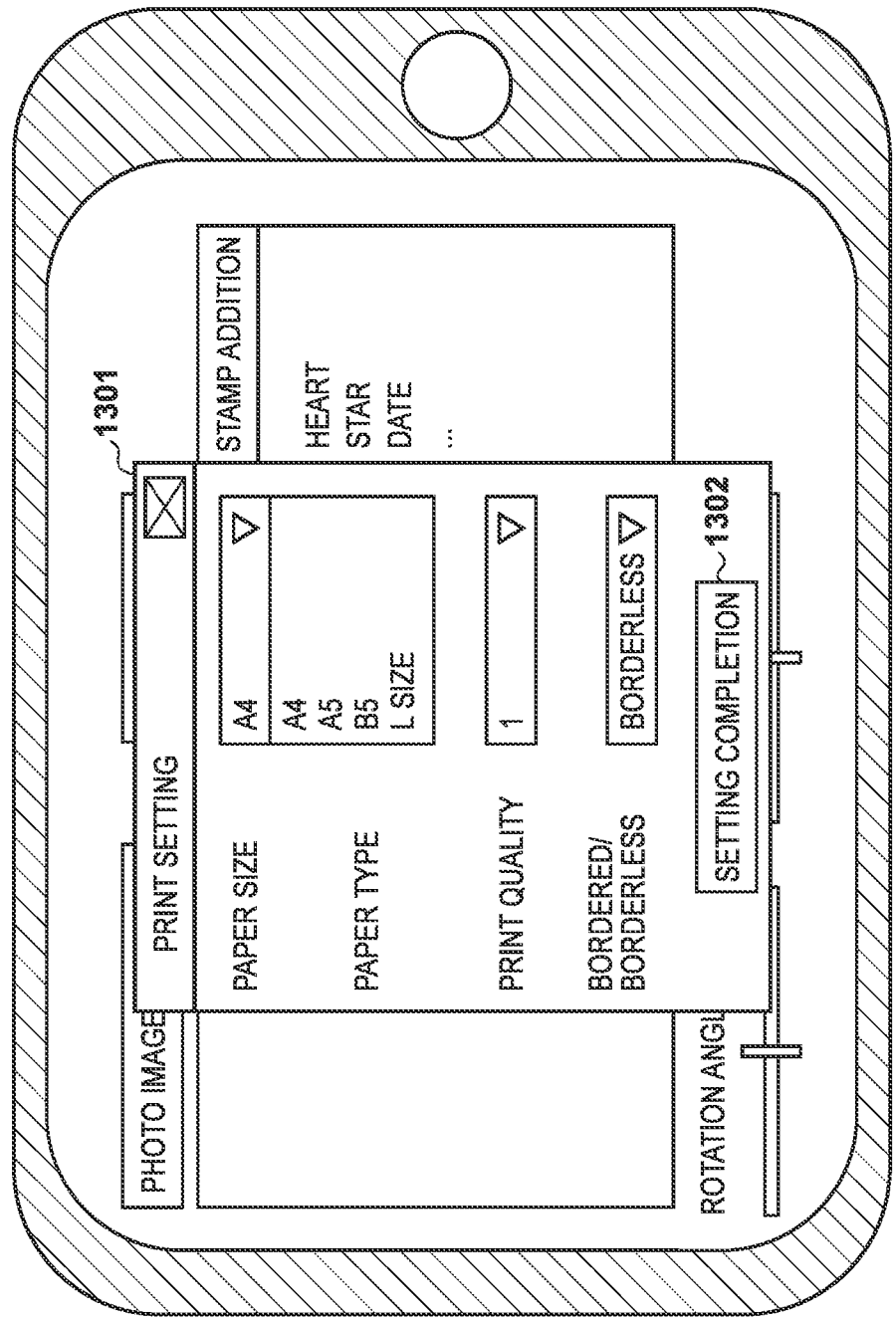
FIG. 13 is a view showing an example of a setting screen.

In step S810, in the script layer 217, the CPU 100 selects a function to be set in the printer based on a user operation on the setting screen 1301. The setting screen 1301 shown in FIG. 13 is an example in which the HTML description of the above example is rendered using the rendering portion 216, and displayed on the display 104. The printer information is requested via the native layer 218, thereby forming the setting screen 1301 based on the information acquired from the printer information by using the above native function.

Note that the HTML description has been explained to be formed in the script layer 217. However, the present invention is not limited to this. For example, an HTML description may be formed in the native layer 218, rendered in the script layer 217, and displayed on the display 104.

Furthermore, each setting item such as the paper size of the setting screen 1301 is provided as a pull-down menu, and can be selected by a user operation. The setting screen 1301 indicates a state in which a list of selectable items is displayed as a setting item of a paper size by a pull-down menu, and a paper size such as A4 or A5 can be selected by a user operation.

In step S811, in the script layer 217, upon detecting a user operation on the setting completion button 1302, the CPU 100 creates setting information including a setting item selected by the user operation and transmits the setting information to the native layer 218. In the above example of the HTML description, SetPrint( ) is also a native function having the binding function. In the above example, SetPrint( ) is used to transfer the paper size, paper type, print quality, and bordered/borderless settings as a character string to the native layer 218.

In step S812, in the native layer 218, the CPU 100 receives the setting information from the script layer 217 by the binding function. In the native layer 218, a print command is generated based on the received setting information according to the communication protocol of the printer as the external device 112, and transmitted to the external device 112 via the external device communication portion 213.

<Details of Rendering Processing>

Figure 10A:
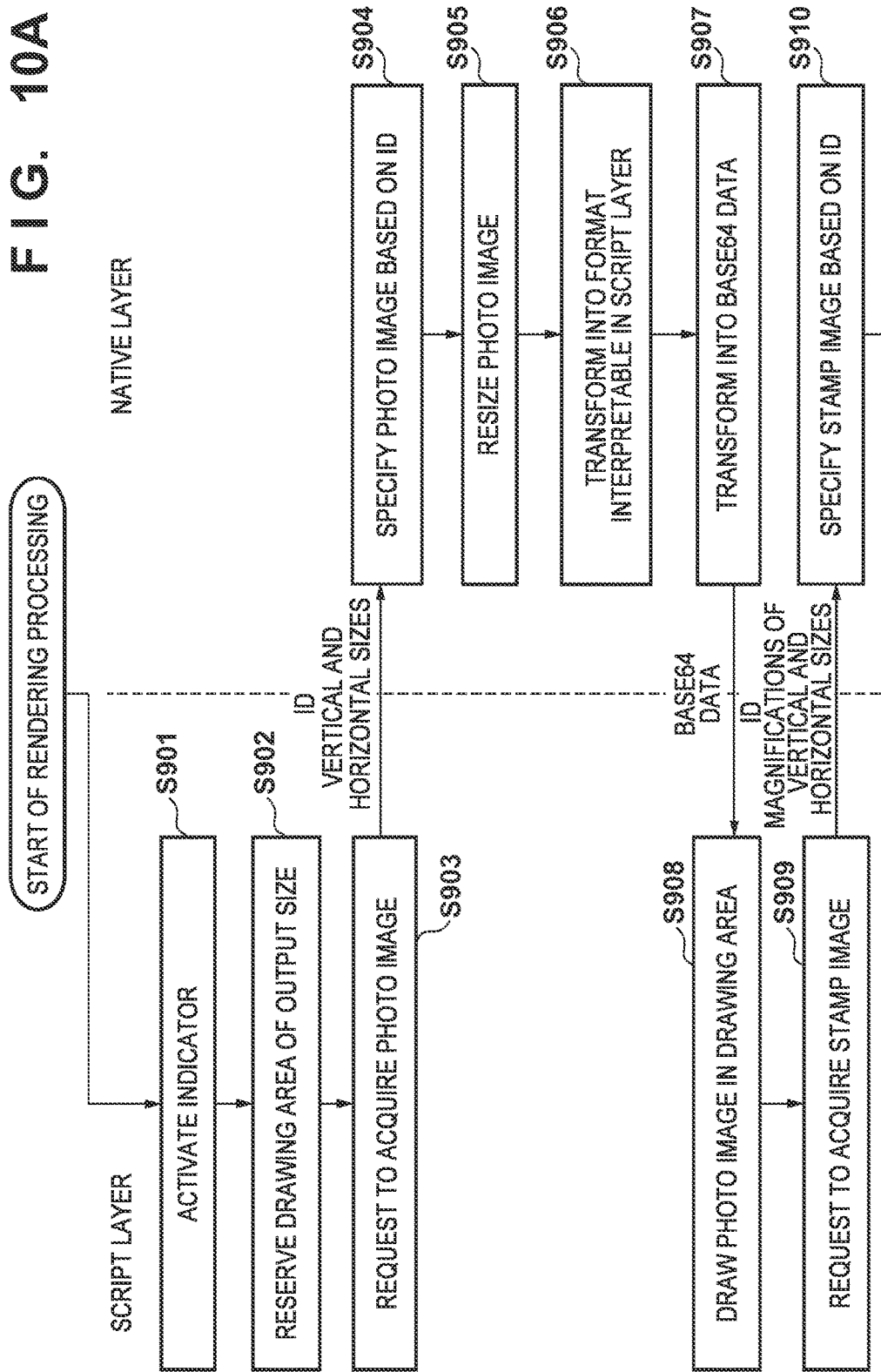
FIGS. 10A and 10B are flowcharts illustrating details of rendering processing.
Figure 10B:
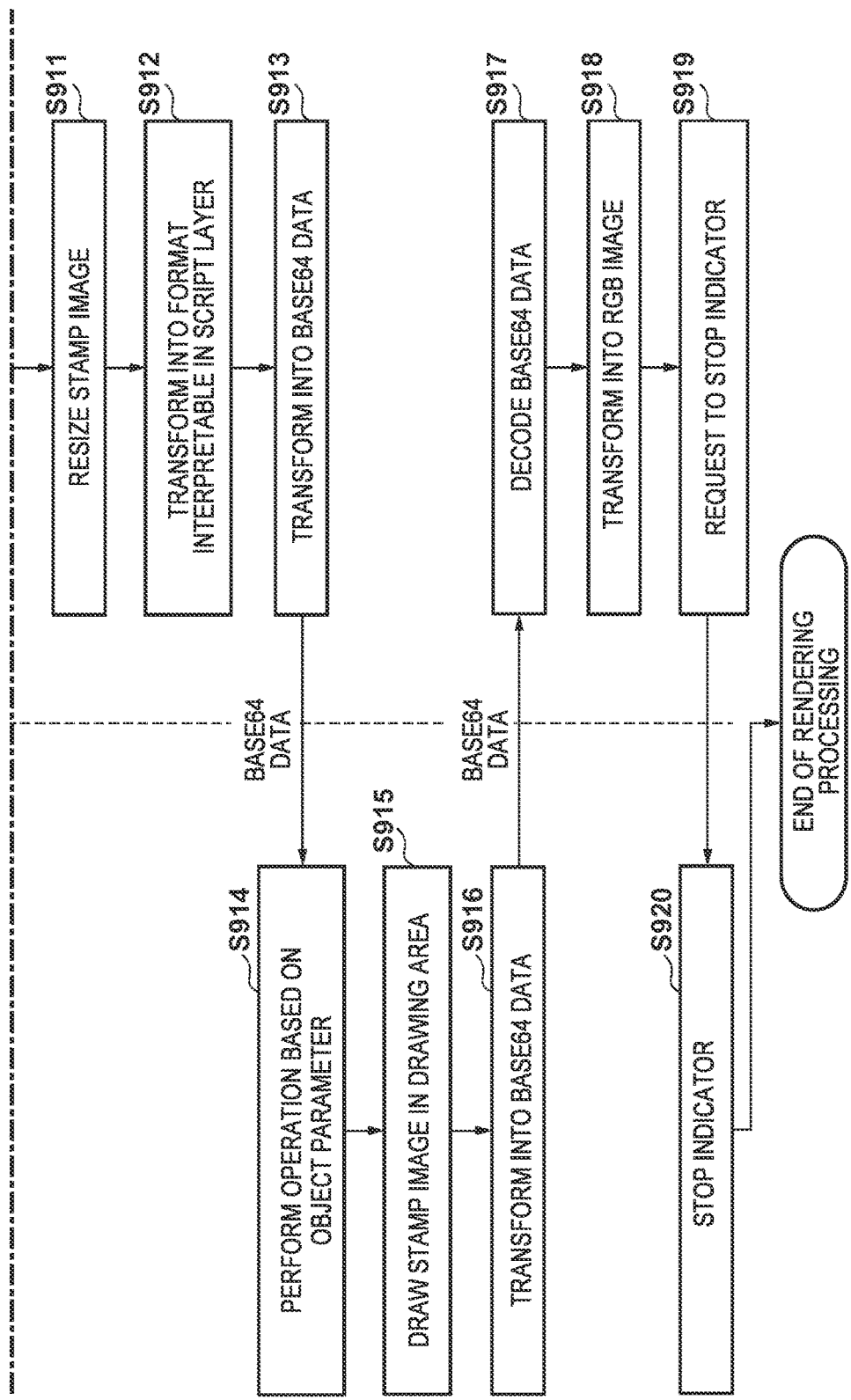

Details of the rendering processing in step S27 of FIG. 3 will be described with reference to FIGS. 10A and 10B.

In step S901, in the script layer 217, the CPU 100 activates an indicator, and displays it on the display 104. In step S902, in the script layer 217, the CPU 100 decides an output size corresponding to the paper size set in the setting information created in step S811, and reserves a drawing area in the RAM 102. In step S903, in the script layer 217, the CPU 100 requests the native layer 218 to acquire a photo image. At this time, the script layer 217 transmits, to the native layer 218, the ID of the photo image and the horizontal size/vertical size of the photo image to be requested.

In step S904, in the native layer 218, the CPU 100 specifies a corresponding photo image (RGB image) based on the ID received from the script layer 217. In step S905, in the native layer 218, the CPU 100 resizes the photo image to the horizontal size/vertical size of the photo image received from the script layer 217. In step S906, in the native layer 218, the CPU 100 transforms the resized photo image into data in a format (for example, the JPEG format) interpretable in the script layer 217. In step S907, in the native layer 218, the CPU 100 transforms the data in the JPEG format into base64 data, and transmits the base64 data to the script layer 217.

In step S908, in the script layer 217, the CPU 100 draws the photo image in the drawing area reserved in step S902 based on the base64 data received from the native layer 218. In the script layer 217, the CPU 100 calculates the magnifications (aspect ratio) of the vertical and horizontal sizes based on the drawing area reserved in step S309 and the output size decided in step S902. After that, in step S909, in the script layer 217, the CPU 100 transmits the magnifications of the vertical and horizontal sizes and the ID of the stamp image to the native layer 218, and requests the native layer 218 to acquire the stamp image.

In step S910, in the native layer 218, the CPU 100 specifies a corresponding stamp image (RGB image) based on the ID received from the script layer 217. In step S911, in the native layer 218, the CPU 100 resizes the stamp image according to the magnifications of the vertical and horizontal sizes of the stamp image received from the script layer 217. In step S912, in the native layer 218, the CPU 100 transforms the resized stamp image into a format (for example, the JPEG format) interpretable in the script layer. In step S913, in the native layer 218, the CPU 100 transforms the data in the JPEG format into base64 data, and transmits the base64 data to the script layer 217.

In step S914, in the script layer 217, the CPU 100 receives the base64 data from the native layer 218, and then operates (rotates) the stamp image based on the object parameter generated in step S509. In step S915, in the script layer 217, the CPU 100 draws the rotated stamp image in the drawing area reserved in step S902. In step S916, in the script layer 217, the CPU 100 acquires the data drawn in the drawing area as base64 data, and transmits the base64 data to the native layer 218. As a method of acquiring base64 data, the toDataURL method of the HTML canvas can be used.

In step S917, in the native layer 218, the CPU 100 decodes the base64 data received from the script layer 217. In step S918, in the native layer 218, the CPU 100 transforms the base64 data into an RGB image. In step S919, in the native layer 218, the CPU 100 requests the script layer 217 to stop the indicator.

In step S920, in the script layer 217, the CPU 100 stops the indicator, and removes the indicator displayed on the display 104.

<Details of Print Processing>

Figure 11:
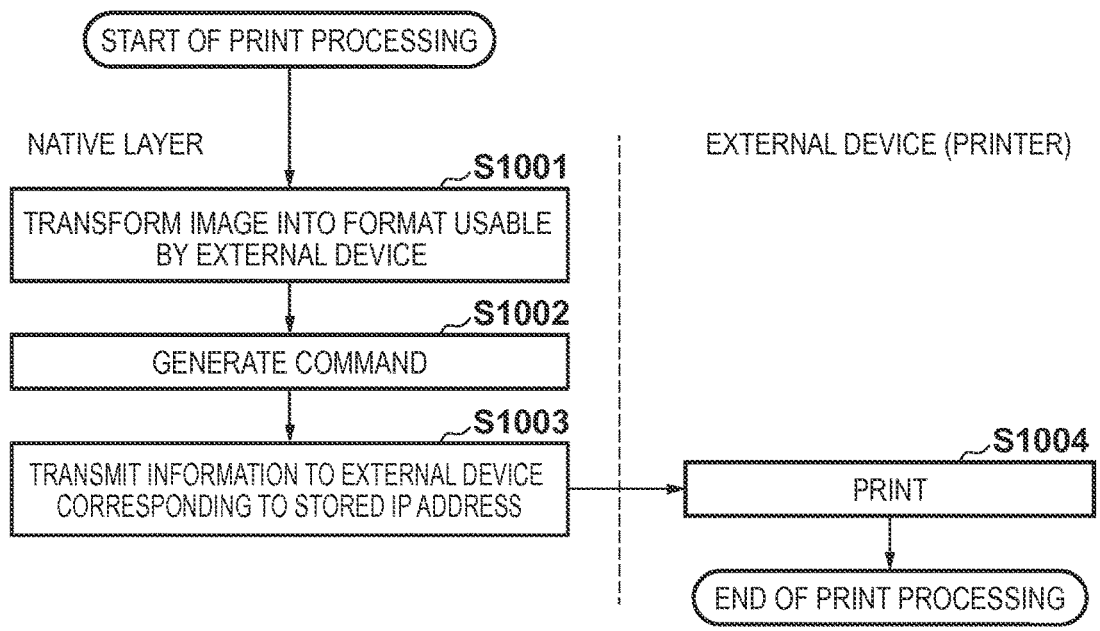
FIG. 11 is a flowchart illustrating details of print processing.

Details of the print processing in step S28 of FIG. 3 will be described with reference to FIG. 11.

In step S1001, in the native layer 218, the CPU 100 transforms the RGB image transformed in step S918 into a format usable by the printer as the external device 112 based on the setting information created in step S811. The format usable by the printer is image data in a printer vender-specific format such as RGB, JPEG, CMYK, or PDF. In step S1002, in the native layer 218, the CPU 100 generates a command to be transmitted to the printer based on the setting information and the image transformed in step S1001. The setting information is, for example, information such as the paper size, paper type, print quality, and bordered/borderless set in the setting screen 1301 by user operations. In step S1003, in the native layer 218, the CPU 100 uses the external device communication portion 213 to transmit the command generated in step S1002 to the external device 112 corresponding to the IP address stored in step S804 in accordance with the communication protocol usable by the printer.

In step S1004, the external device 112 executes printing according to the command received from the information processing apparatus 115.

As described above, according to this embodiment, the script layer which cannot generally communicate with an external device can communicate with the external device via the native layer. The script layer can request information provision and acquire device information (printer information), and can also generate a command to execute printing by the printer.

Second Embodiment

In the first embodiment, a case in which the external device 112 is a printer has been exemplified. In the second embodiment, a case in which an external device 112 is a digital camera will be exemplified. Note that the same hardware and software arrangements as those in the first embodiment are included in the second embodiment. Only the difference from the first embodiment will be described for the sake of simplicity.

Figure 14:
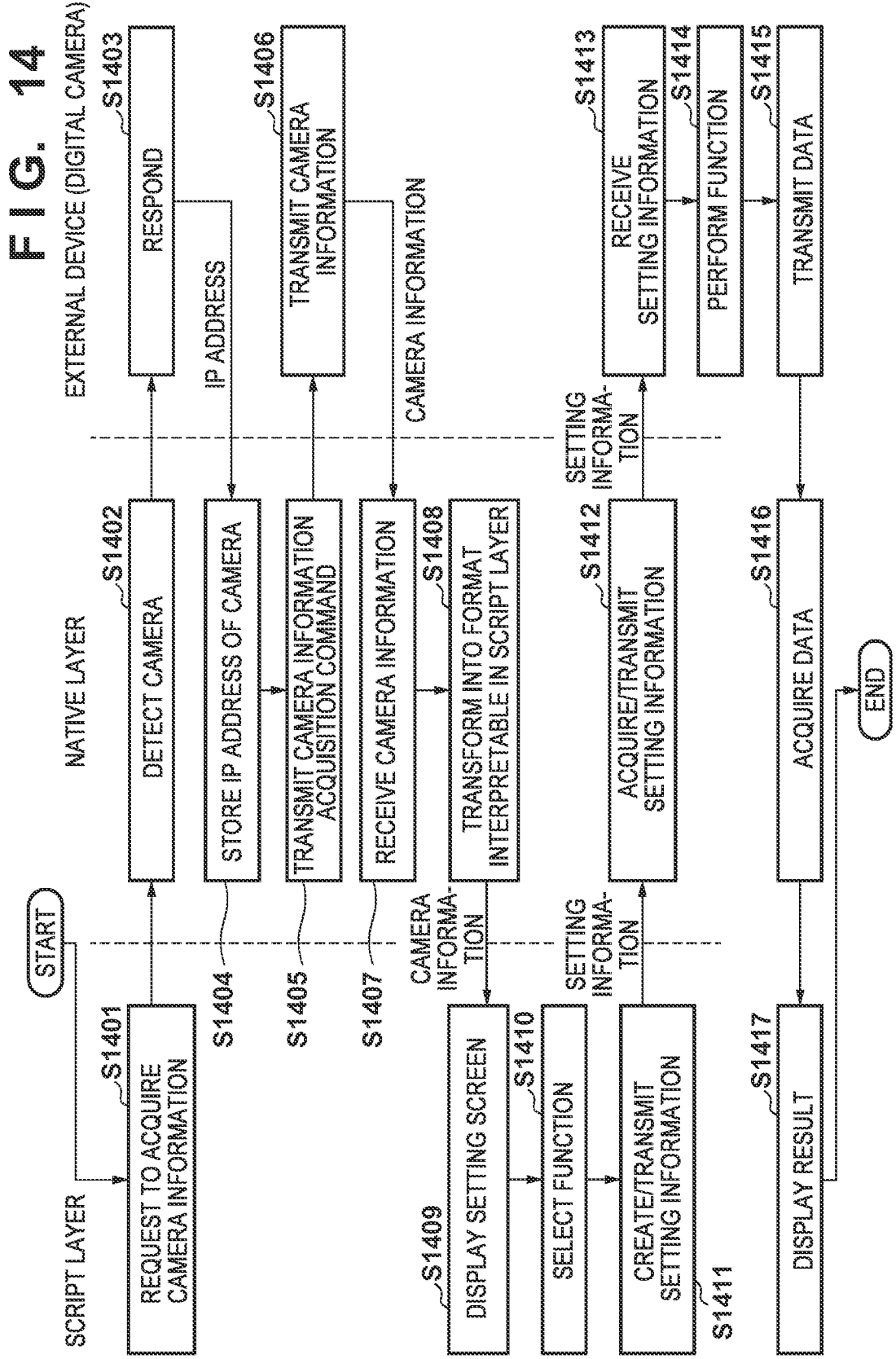
FIG. 14 is a flowchart illustrating processing executed between an information processing apparatus and a digital camera.

FIG. 14 is a flowchart illustrating processing executed between an information processing apparatus and the digital camera. In this embodiment, the processing starts when the user instructs correction by the digital camera by operating a button of an application (not shown). Note that processes in steps S1401 to S1411 can be explained by replacing the printer information as a processing target in steps S801 to S811 of FIG. 9 by camera information of the digital camera and a detailed description thereof will be omitted.

The camera information is information about the functions of the digital camera as the external device 112, and is, for example, information about image processing functions such as automatic photo correction function, red eye correction function, skin correction function, monochromatic processing function, and sepia processing function. The automatic photo correction function is a function of automatically analyzing a photo image using human face detection or a scene analysis portion, and performing appropriate brightness/white balance adjustment (see, for example, Japanese Patent Laid-Open No. 2010-278708). The red eye correction function is a function of automatically detecting a red eye image from images and correcting it (see, for example, Japanese Patent Laid-Open No. 2006-350557). The skin correction function is a function of detecting a human face from a photo image, and preferably processing the skin region of the face (see, for example, Japanese Patent Laid-Open No. 2010-10938). The monochromatic processing indicates a known monochrome transform, and sepia processing indicates a known sepia transform.

Note that the camera information is merely an example. Various kinds of information about the digital camera can be used as camera information. For example, information about the GPS function, remaining battery level, or memory usage rate of the digital camera can be used as the camera information.

In step S1409, based on such camera information, it is possible to form a camera setting screen including setting items such as an automatic photo correction function, red eye correction function, skin correction function, monochromatic processing function, and sepia processing function which are image processing functions of the digital camera. In addition to setting of the setting items in the camera setting screen, an image to undergo image processing may be selected. In this case, similarly to the processing shown in FIG. 4, the script layer 217 requests the native layer 218 to acquire an image, and the native layer 218 performs processing.

In step S1412, in the native layer 218, the CPU 100 receives the setting information from the script layer by the binding function. In the native layer 218, the CPU 100 transmits the setting information and an image to undergo image processing to the external device 112 (digital camera) via the external device communication portion 213. This transmission processing is performed according to the protocol supported by the external device 112.

In step S1413, the external device 112 receives the setting information and image from the information processing apparatus 115. In step S1414, the external device 112 performs the image processing of the function set in the setting information for the received image. In step S1415, the external device 112 transmits data to the native layer 218. The data includes the image having undergone the image processing in step S1414. The data is transmitted to the native layer 218 via the external device communication portion 213 in accordance with the protocol supported by the external device 112.

In step S1416, in the native layer 218, the CPU 100 acquires the data including the image having undergone the image processing.

In step S1417, in the script layer 217, the CPU 100 displays, on the display 104, the image included in the data received from the native layer 218. This reception processing is executed after the native layer 218 transforms the data into data in a format interpretable in the script layer 217, as described above. An image display method is as described above and a description thereof will be omitted. After that, as in the first embodiment, it is possible to print the displayed image by communicating with the printer as the external device 112.

As described above, according to this embodiment, the script layer which cannot generally communicate with an external device under security restrictions can communicate with the external device via the native layer.

Third Embodiment

In the third embodiment, the same hardware and software arrangements as those in the first embodiment are included. Only the difference from the first embodiment will be described for the sake of simplicity. In the first embodiment, the script layer 217 transmits a request and instruction to the printer as an external device. To the contrary, in the third embodiment, although an external device and a script layer 217 cannot generally communicate with each other, an arrangement for implementing data transmission and an instruction from the external device to the script layer 217 will be described.

Figure 15:
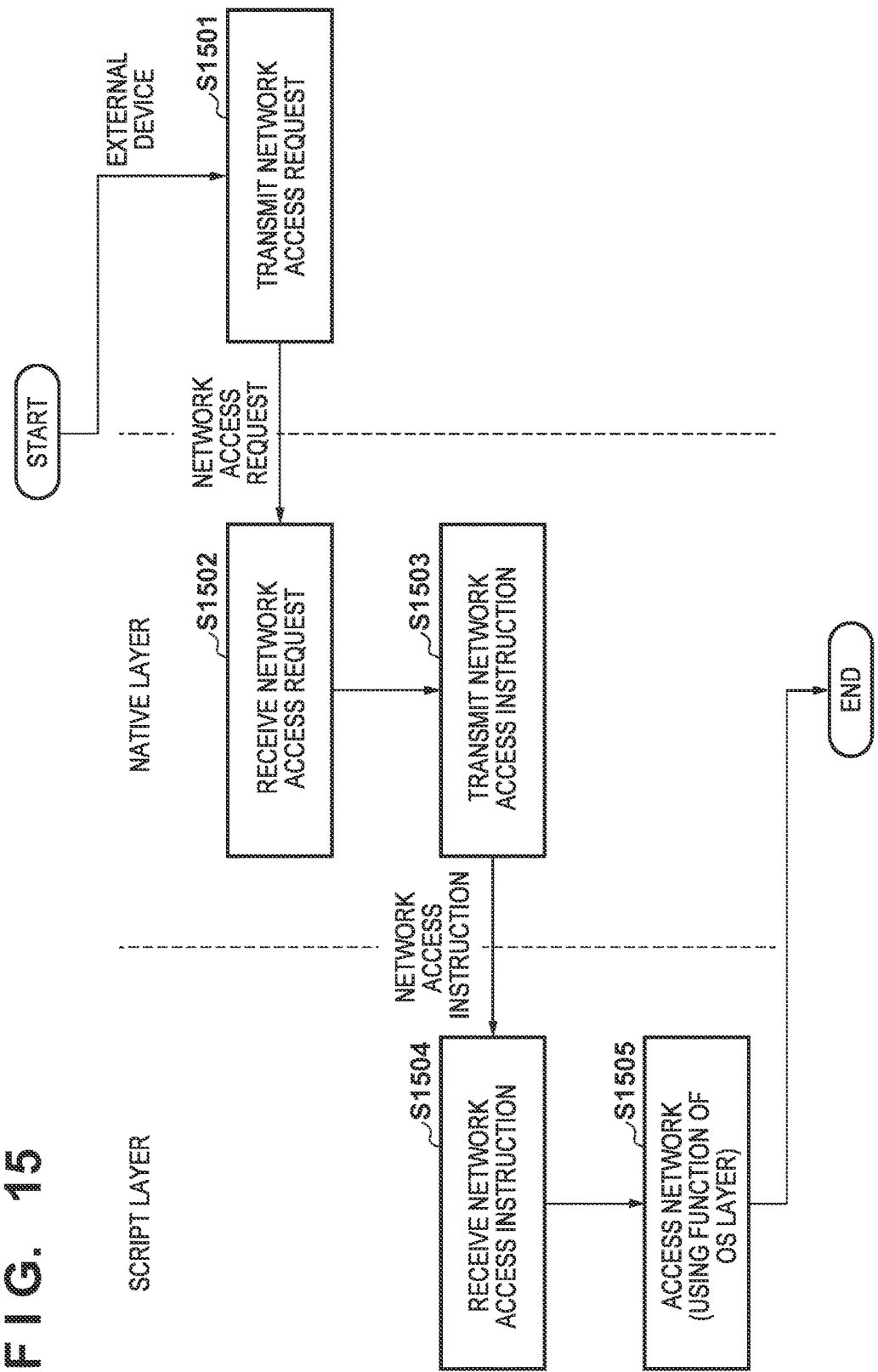
FIG. 15 is a flowchart illustrating processing executed between an information processing apparatus and an external device.

FIG. 15 is a flowchart illustrating processing executed between an information processing apparatus and an external device.

In step S1501, an external device 112 transmits a network access request to a native layer 218 via an external device communication portion 213. As contents of the network access request, for example, the status of a printer as the external device 112, a notification, or the like is displayed in an SNS (Social Networking Service) often used by the user, or an order is made when the validity period of ink expires.

In step S1502, in the native layer 218, a CPU 100 receives the network access request from the external device 112. In step S1503, in the native layer 218, the CPU 100 transmits a network access instruction to the script layer 217.

In step S1504, in the script layer 217, the CPU 100 receives the network access instruction from the native layer 218. In step S1505, in the script layer 217, the CPU 100 uses an OS layer 219 to access an access destination designated by the network access instruction to the Web or the like in accordance with the network access instruction. In this access operation, for example, data is posted to an SNS, a status is transmitted to a server, or mail is transmitted to the user.

As described above, according to this embodiment, for example, even if the main body of the external device 112 is not confirmed, it is possible to grasp the status of the device by posting data in an SNS often used by the user or transmitting mail. When the external device is, for example, a printer, the status of the external device includes a status in which the remaining amount of ink or printing paper is small, a status in which the validity period of ink will expire soon, and a status in which the temperature of the installation location is too high. Furthermore, even if the communication of the printer is local and the printer is not connected to a so-called WAN, it is possible to perform communication using the WAN.

Fourth Embodiment

In each of the aforementioned embodiments, a case in which a hybrid application is operated on a portable information terminal as the information processing apparatus 115 has been exemplified. The present invention, however, is not limited to this. For example, as an environment in which the hybrid application operates, in addition to information terminals represented by a smartphone and table PC, other electronic apparatuses such as a PC, server, game machine, and digital camera are possible.

In addition, in each of the aforementioned embodiments, the printer has been exemplified as an external device. The present invention, however, is not limited to this. For example, another electronic apparatus capable of providing information about itself, such as another smartphone, tablet PC, PC, server, game machine, or scanner, may be used as an external device. For example, it is possible to acquire, from the script layer, information about the electronic apparatus such as the function of the electronic apparatus like the battery level, communication status, wireless LAN connection presence/absence, GPS, temperature, humidity, and acceleration of another portable information terminal.

Examples of an external device are an electric appliance and car. For example, it is possible to acquire information of an electronic apparatus such as an external refrigerator, washing machine, air conditioner, lighting, vacuum cleaner, or thermo pot from the script layer on the portable information terminal, and adjust ON/OFF and output of the function of the electronic apparatus.

Furthermore, in each of the aforementioned embodiments, as a method of drawing contents (a photo image or stamp image), the canvas function of JavaScript has been exemplified. A method of drawing contents is not limited to this. For example, it is possible to draw contents using SVG (Scalable Vector Graphics).

In addition, as the printer according to each of the aforementioned embodiments, an inkjet printer, a laser printer, a dye-sublimation printer, a dot impact printer, or the like can be used. These printers may be so-called multifunction peripherals having not a single function but the printer function, the scanner function, and the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-122748 filed Jun. 13, 2014 which is hereby incorporated by reference herein in its entirety.

What is claimed is:

1. An apparatus comprising:
a processor; and
a storage unit configured to store a hybrid application program to be executed by the processor, the hybrid application program including a first program layer with an instruction set to be interpreted and executed by the processor and a second program layer with an instruction set compiled in advance by another apparatus other than the processor;
wherein the processor performs:
a first displaying step in which the first program layer causes a screen to display a user interface for receiving an instruction from a user;
an image acquisition step in which, in response to receiving a first instruction via the user interface, the second program layer acquires image data stored in a predetermined storage medium as image data in a first data format;
an associating step in which the second program layer associates the image data acquired in the image acquisition step with a predetermined ID;
a conversion step in which the second program layer converts the image data in the first data format into image data in a second data format usable in the first program layer, wherein the image data in the first data format can be used in the second program layer and cannot be used in the first program layer;
a second displaying step in which the first program layer acquires the image data in the second data format obtained in the conversion step and causes the screen to display the image data in the second data format;
an identifying step in which the second program layer identifies the image data in the first data format with which the predetermined ID is associated, based on the predetermined ID received from the first program layer after the displaying in the second displaying step; and
a processing step in which the second program layer performs predetermined image processing to the image data which is identified in the identifying step and is not received from the first program layer.

2. A method in an apparatus having a processor and a memory storing a hybrid application program including a first program layer with an instruction set to be interpreted and executed by the processor and a second program layer with an instruction set compiled in advance by another apparatus other than the processor, the method comprising:
a first displaying step in which the first program layer causes a screen to display a user interface for receiving an instruction from a user;
an image acquisition step in which, in response to receiving a first instruction via the user interface, the second program layer acquires image data stored in a predetermined storage medium as image data in a first data format;
an associating step in which the second program layer associates the image data acquired in the image acquisition step with a predetermined ID,
a conversion step in which the second program layer converts the image data in the first data format into image data in a second data format usable in the first program later, wherein the image data in the first data format can be used in the second program layer and cannot be used in the first program layer;
a second displaying step in which the first program layer acquires the image data in the second data format obtained in the conversion step and causes the screen to display the image data in the second data format;
an identifying step in which the second program layer identifies the image data in the first data format with which the predetermined ID is associated, based on the predetermined ID received from the first program layer after the displaying in the second displaying step; and
a processing step in which the second program layer performs predetermined image processing to the image data which is identified in the identifying step and is not received from the first program layer.

3. The method according to claim 2, further comprising a transmitting step in which, in response to receiving a second instruction from the user via the user interface, the second program layer transmits processing target image data which is based on the image data to which the predetermined image processing is performed, to the external device.

4. The method according to claim 3, further comprising a second conversion step in which, in response to receiving the second instruction, the second program layer converts a data format of the processing target image data into a third data format usable in an external device, wherein, in the transmitting step, the second program layer transmits the processing target image data obtained by the conversion in the second conversion step, to the external device.

5. The method according to claim 4, wherein the data format of the processing target image data is RGB format, and the third data format is JPEG format.

6. The method according to claim 4, wherein the second program layer includes a data holding portion for holding the image data in the first data format acquired in the first acquisition step as a target object to be converted in the second conversion step.

7. The method according to claim 6, wherein, when receiving the second instruction from the first program layer, the second program layer performs, in the transmitting step, the transmitting of the processing target image data which is based on image data identified by the predetermined ID among image data held in the data holding portion.

8. The method according to claim 4, further comprising a device information acquisition step in which the second program layer communicates with the external device in response to receiving a request from the first program layer and acquires, from the external device, information related to processing of the external device.

9. The method according to claim 8, wherein the external device is a printer, and in the device information acquisition step, the second program layer acquires at least one of a paper type, a size, the presence/absence of a borderless print function, and the printing quality of the printer.

10. The method according to claim 8, wherein the first program layer acquires the device information which the second program layer has acquired and causes the screen to display a setting screen based on the acquired device information in the first displaying step, the second program layer receives, from the first program layer, setting information based on the user's operation on the setting screen.

11. The method according to claim 10, wherein the second program layer performs the conversion of the second conversion step on the image, based on the setting information.

12. The method according to claim 10, wherein, in the transmitting step, the second program layer transmits to the external device the processing target image data and a command generated based on the setting information.

13. The method according to claim 3, wherein the external device is a printer and the instruction is a printing instruction, wherein the second program layer transmits in the transmitting step the processing target image data as print data to the printer, whereby the printer prints an image based on the print data.

14. The method according to claim 2, wherein, in the second displaying step, the first program layer causes the screen to display an image in a predetermined display area of the user interface.

15. The method according to claim 2, wherein the second data format is a data format representing text data.

16. The method according to claim 15, wherein the second data format is text data converted according to "Base64".

17. The method according to claim 16, wherein the first data format is JPEG.

18. The method according to claim 3, wherein in the transmitting step, the second program layer transmits to the external device the processing target image data to which resizing or addition of a stamp processing has been applied.

19. The method according to claim 2, wherein, in response to receiving a user's correction instruction via the user interface, the first program layer generates correction instruction data usable in the second program based on the user's correction instruction, and the second program layer performs an image correction processing, in the processing step, on the image data which is identified in the identifying step and is not received from the first program layer, based on the correction instruction data.

20. The method according to claim 2, wherein the second program layer converts the image data to which the predetermined image processing is performed in the processing step, into the image data in the second data format, the second program layer provides the image data with the second data format, to the first program layer, and the first program layer causes the screen to display the image data provided by the second program layer.

21. The method according to claim 20, wherein in the transmitting step, the second program layer receives the image data with the second data format as the processing target image data, and transmits the processing target image data, to the external device.

22. The method according to claim 21, wherein in the transmitting step, the second program layer converts the image data with the second data format into image data in the first data format.

23. The method according to claim 2, wherein the predetermined image processing is resizing.

24. The method according to claim 2, wherein in the associating step, the second program layer receives the predetermined ID from the first program layer and associates the image data acquired in the image acquisition step with the received predetermined ID.

25. The method according to claim 2, wherein in the image acquisition step, in response to receiving the first instruction via the user interface, the first program layer makes a request to the second program layer to acquire image data, whereby, in response to the request, the second program layer causes the screen to display a user interface in which a user selects an image, and acquires image data of the image selected in the user interface.

26. A non-transitory computer-readable storage medium storing a hybrid application program causing a processer in a computer to execute a method, the hybrid application program including a first program layer with an instruction set to be interpreted and executed by the processor and a second program layer with an instruction set compiled in advance by another apparatus other than the processor, the method comprising:

a first displaying step in which the first program layer causes a screen to display a user interface for receiving an instruction from a user;

an image acquisition step in which, in response to receiving a first instruction via the user interface, the second program layer acquires image data stored in a predetermined storage medium as image data in a first data format;

an associating step in which the second program layer associates the image data acquired in the image acquisition step with a predetermined ID;

a conversion step in which the second program layer converts the image data in the first data format into image data in a second data format usable in the first program later, wherein the image data in the first data format can be used in the second program layer and cannot be used in the first program layer;

a second displaying step in which the first program layer acquires the image data in the second data format obtained in the conversion step and causes the screen to display the image data in the second data format;

an identifying step in which the second program layer identifies the image data in the first data format with which the predetermined ID is associated, based on the predetermined ID received from the first program layer after the displaying in the second displaying step; and a processing step in which the second program layer performs predetermined image processing to the image data which is identified in the identifying step and is not received from the first program layer.

* * * * *